(12) United States Patent
Gabel et al.

(10) Patent No.: US 9,501,574 B2
(45) Date of Patent: Nov. 22, 2016

(54) DETERMINING AN INFLUENTIAL AUDIENCE MEMBER

(71) Applicant: Tubular Labs, Inc., Mountain View, CA (US)

(72) Inventors: Robert L. Gabel, Los Gatos, CA (US); David A. Koblas, Los Altos, CA (US); Allison J. Stern, San Francisco, CA (US)

(73) Assignee: Tubular Labs, Inc., Mountain View, CA (US)

( * ) Notice: Subject to any disclaimer, the term of this patent is extended or adjusted under 35 U.S.C. 154(b) by 0 days.

(21) Appl. No.: 14/553,804

(22) Filed: Nov. 25, 2014

(65) Prior Publication Data

US 2015/0081664 A1   Mar. 19, 2015

Related U.S. Application Data

(63) Continuation of application No. 13/902,570, filed on May 24, 2013, now Pat. No. 8,935,713.

(60) Provisional application No. 61/738,009, filed on Dec. 17, 2012.

(51) Int. Cl.
| | |
|---|---|
| *H04N 7/173* | (2011.01) |
| *G06F 17/30* | (2006.01) |
| *H04N 21/442* | (2011.01) |
| *G06F 11/14* | (2006.01) |
| *G06Q 30/02* | (2012.01) |
| *H04N 21/258* | (2011.01) |
| *H04L 29/08* | (2006.01) |

(Continued)

(52) U.S. Cl.
CPC ..... *G06F 17/30867* (2013.01); *G06F 11/1453* (2013.01); *G06F 17/3082* (2013.01); *G06F 17/30828* (2013.01); *G06F 17/30864* (2013.01); *G06Q 30/0241* (2013.01); *H04H 60/33* (2013.01); *H04H 60/65* (2013.01); *H04L 67/22* (2013.01); *H04N 21/252* (2013.01); *H04N 21/25891* (2013.01); *H04N 21/44213* (2013.01); *H04N 21/44222* (2013.01); *H04N 21/4826* (2013.01); *H04L 67/306* (2013.01); *H04N 21/812* (2013.01)

(58) Field of Classification Search
CPC ............... G06F 17/30867; G06F 17/30828; G06F 17/30864; G06F 17/3082; G06F 11/1453; H04N 21/4826; H04N 21/252; H04N 21/25891; H04N 21/44222; H04N 21/44213; H04N 21/812; H04H 60/65; H04H 60/33; H04L 67/22; H04L 67/306; G06Q 30/0241
USPC ............ 725/87, 93, 115, 116; 715/751, 753; 707/723, 748
See application file for complete search history.

(56) References Cited

U.S. PATENT DOCUMENTS

| | | | |
|---|---|---|---|
| 8,682,809 B2 * | 3/2014 | Avedissian et al. .......... | 705/347 |
| 2008/0109491 A1 * | 5/2008 | Gupta ........................ | 707/104.1 |
| 2014/0019862 A1 * | 1/2014 | Fink et al. .................... | 715/719 |

*Primary Examiner* — Hoang-Vu A Nguyen-Ba

(74) *Attorney, Agent, or Firm* — Van Pelt, Yi & James LLP

(57) ABSTRACT

Determining a video audience is disclosed, including: identifying a set of videos based at least in part on a received criterion; querying a video database to retrieve engagements associated with each of at least a subset of the set of videos; identifying a set of audience members associated with the engagements associated with each of the at least subset of the set of videos; and querying a user database to gather events associated with each of at least a subset of the set of audience members.

23 Claims, 21 Drawing Sheets

(51) Int. Cl.
*H04H 60/33* (2008.01)
*H04H 60/65* (2008.01)
*H04N 21/25* (2011.01)
*H04N 21/482* (2011.01)
*G06F 3/00* (2006.01)
*G06F 7/00* (2006.01)
*H04N 21/81* (2011.01)

FIG. 12 tubular — 1202

CHANNEL THEMINASHOW ▼ → LIST AUDIENCE ▼ — 1204
149,004 AUDIENCE MEMBERS FOUND — 1216

FILTER AUDIENCE

LIKELY AGE
ANY  13-17  18-24
25-34  35-54  55+

LIKELY GENDER
[ANY ▼]

SUBSCRIBED TO CHANNEL
[ALL ▼]

ENGAGEMENTS
[ANY ▼]

SUBSCRIBERS
[ANY ▼]

COUNTRY
[ALL ▼]

TYPE
[ALL ▼]

USERNAME
[ENTER CHANNEL NAME]

[RESET]  [APPLY]

[+ CREATE LIST] — 1214

| AUDIENCE LIST | AUDIENCE ALSO WATCHES | KEY COMMENTS | | |
|---|---|---|---|---|
| N | USERS — 1208 | ENGAGEMENTS 1210 ⓘ | VIDEOS ENGAGED 1212 ⓘ | USER'S OWN SUBSCRIBERS ⓘ | |
| 1 | ILOVETALKSHOWS | 9 | 9 | 541,696 | SUBSCRIBE |
| 2 | KOALA435 | 1 | 1 | 551,367 | SUBSCRIBE |
| 3 | ZERKAAHD | 1 | 1 | 364,254 | SUBSCRIBE |
| 4 | FOUSEYTUBE | 2 | 1 | 323,836 | SUBSCRIBE |
| 5 | CHARLIESVLOGS | 1 | 1 | 294,482 | SUBSCRIBE |
| 6 | SOARSNIPING | 1 | 1 | 317,994 | SUBSCRIBE |
| 7 | PAINT | 1 | 1 | 548,958 | SUBSCRIBE |
| 8 | ITSJERRYANDHARRY | 1 | 1 | 363,578 | SUBSCRIBE |
| 9 | BANANAFONE34 | 1 | 1 | 217,341 | SUBSCRIBE |
| 10 | JENNIFERJCHUNG | 1 | 1 | 137,326 | SUBSCRIBE |
| 11 | BYTWISTED | 1 | 1 | 119,518 | SUBSCRIBE |
| 12 | TRICKSHOTTING | 1 | 1 | 115,580 | SUBSCRIBE |
| 13 | DOMINATER005 | 1 | 1 | 73,035 | SUBSCRIBE |
| 14 | ICALLITAMBROSIA | 2 | 2 | 76,280 | SUBSCRIBE |
| 15 | SHOPVAGABONDYOUTH | 1 | 1 | 79,205 | SUBSCRIBE |
| 16 | NICOLASCAGE09 | 11 | 2 | 70,127 | SUBSCRIBE |
| 17 | PINKIECHARM | 1 | 1 | 65,999 | SUBSCRIBE |

1218

FIG. 14 tubular ─ 1612

CINDYSLOOKBOOK
390K SUBSCRIBERS   98 VIDEOS

HELLO! WELCOME TO TUBULAR.
TUBULAR SHOWS YOU AUDIENCE MEMBERS THAT ENGAGE WITH YOUR CHANNEL. FOR [CHANNEL NAME] WE'VE FOUND [X] TOTAL. USE THE FILTERS TO THE LEFT TO CHANGE THE DATE RANGE, GENDER, OR COUNTRY, OR CLICK THE INFLUENCERS BUTTON BELOW TO SEE YOUR MOST INFLUENTIAL FANS. SWITCH CHANNELS TO LOOK AT THE FANS OF ANOTHER CHANNEL (YOU CAN ADD 5 TOTAL). ─ 1608

BOB SMITH
SWITCH CHANNEL ▼

48K AUDIENCE MEMBERS FOUND

APRIL 21, 2013 - MAY 20, 2013

DEMOGRAPHIC
MALES AND FEMALES BETWEEN THE AGES OF 13-17, 18-24, 25-34, 35-55 AND 56+

SUBSCRIBED & NOT SUBSCRIBED ▼
ANY ACTIVITIES ▼
ANY SUBSCRIBERS ▼
ANY COUNTRY ▼

↻ RESET FILTERS      → APPLY FILTERS

| | AUDIENCE | INSIGHTS | ACTIVITIES | | |
|---|---|---|---|---|---|
| | 1614 | FANS 1602 | 1618 INFLUENCERS | 1604 | 1606 |
| | CHANNEL | FANS | ACTIVITIES | VIDEOS ENGAGED | SUBSCRIBERS |
| 1 | BLUEGIRL267 | 203 | 45 | 0 | |
| 2 | TETICAROLINE | 102 | 17 | 1 | |
| 3 | MONKICHI3 | 91 | 11 | 2 | |
| 4 | 6NEECHEE13 | 81 | 9 | 0 | |
| 5 | TANYAAMANYAA | 81 | 9 | 0 | |
| 6 | HONGNHUNG52 | 81 | 8 | 3 | |
| 7 | LELLU KUPRADZE | 77 | 12 | 0 | |

FIG. 16 tubular

CINDYSLOOKBOOK  390K SUBSCRIBERS  98 VIDEOS

HELLO! WELCOME TO TUBULAR.
TUBULAR SHOWS YOU AUDIENCE MEMBERS THAT ENGAGE WITH YOUR CHANNEL. FOR [CHANNEL NAME] WE'VE FOUND [X] TOTAL. USE THE FILTERS TO THE LEFT TO CHANGE THE DATE RANGE, GENDER, OR COUNTRY, OR CLICK THE INFLUENCERS BUTTON BELOW TO SEE YOUR MOST INFLUENTIAL FANS. SWITCH CHANNELS TO LOOK AT THE FANS OF ANOTHER CHANNEL (YOU CAN ADD 5 TOTAL).

BOB SMITH    SWITCH CHANNEL ▼

48K AUDIENCE MEMBERS FOUND

▼ AUDIENCE FILTERS
APRIL 21, 2013 - MAY 20, 2013

DEMOGRAPHIC
MALES AND FEMALES BETWEEN THE AGES OF 13-17, 18-24, 25-34, 35-55 AND 56+

SUBSCRIBED & NOT SUBSCRIBED ▼
ANY ACTIVITIES ▼
ANY SUBSCRIBERS ▼
ANY COUNTRY ▼

⟳ RESET FILTERS    → APPLY FILTERS

| | AUDIENCE | INSIGHTS | ACTIVITIES | | |
|---|---|---|---|---|---|
| | | FANS | INFLUENCERS | | |
| | CHANNEL | ACTIVITIES | FANS | VIDEOS ENGAGED | SUBSCRIBERS |
| 1 | CINDYSLOOKBOOK | 65 | | 5 | 390K |
| 2 | ANNEORSHINE | 11 | | 3 | 405K |
| 3 | SHAAANXO | 54 | | 1 | 332K |
| 4 | EVELINICIUTZA | 54 | | 1 | 279K |
| 5 | BEAUTYBYJJ | 9 | | 1 | 219K |
| 6 | THEPLATFORM | 10 | | 2 | 225K |
| 7 | BEAUTYCAKEZ | 10 | | 2 | 137K |

DETERMINING AN INFLUENTIAL AUDIENCE MEMBER

CROSS REFERENCE TO OTHER APPLICATIONS

This application is a continuation of co-pending U.S. patent application Ser. No. 13/902,570, entitled DETERMINING AUDIENCE MEMBERS ASSOCIATED WITH A SET OF VIDEOS filed May 24, 2013 which is incorporated herein by reference for all purposes, which claims priority to U.S. Provisional Patent Application No. 61/738,009 entitled DETERMINING MEDIA AUDIENCE LIST filed Dec. 17, 2012 which is incorporated herein by reference for all purposes.

BACKGROUND OF THE INVENTION

At a video sharing platform, an administrator of an account may upload videos that other users may view and interact with. Conventionally, the administrator of the account may learn more about his or her video audience by manually keeping track of the users that have interacted with his or her video content. However, there could be numerous such users and manually tracking the users' interactions with the videos could be very time consuming and laborious, if not impractical.

BRIEF DESCRIPTION OF THE DRAWINGS

Various embodiments of the invention are disclosed in the following detailed description and the accompanying drawings.

FIG. 12 is a diagram showing an example of a user interface with a display of audience members found for a particular video channel.

FIG. 14 is a diagram showing an example of a user interface for viewing key comments.

FIG. 16 is a diagram showing another example of a user interface with a display associated with audience members that have been found for a particular video channel.

FIG. 17 is a diagram showing another example of a user interface with a display associated with the identified subset of influential audience members that have been found for a particular video channel.

FIG. 19 is a diagram showing another example of a user interface with a display of other video content that audience members watch.

DETAILED DESCRIPTION

Figure 1:
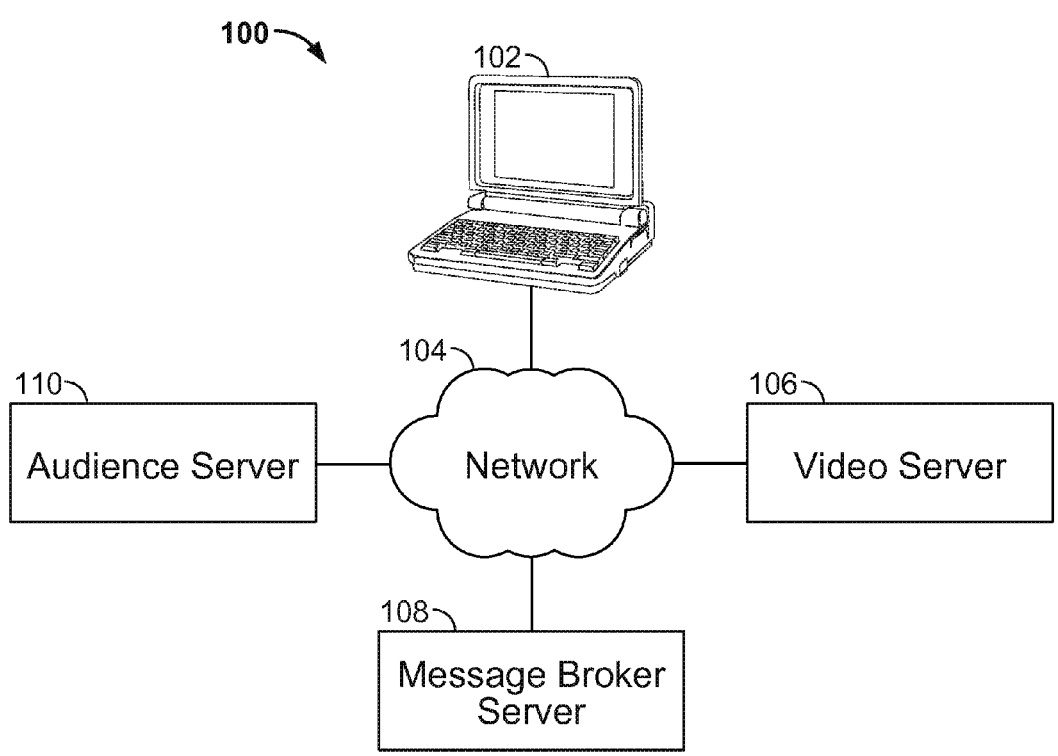
FIG. 1 is a diagram showing an embodiment of a system for determining a video audience.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining a video audience are described herein. A set of videos is identified based on a received set of criteria. For example, the set of criteria may include one or more keywords and an identifier of a video website at which to search for a set of videos that match the keywords. A video database (e.g., that stores metadata associated with each video available at the video website that matches the criteria) is queried for engagements associated with each of at least a subset of the set of videos. For example, an engagement is a stored comment submitted by a user for a video. Engagements stored for each video may be retrieved. A set of audience members associated with the retrieved engagements associated with each of the at least subset of the set of videos is identified. For example, each (unique) user name associated with the retrieved engagements may be identified as an audience member. A video database is queried to gather events associated with each of at least a subset of the set of audience members. Examples of events include historical user preference and/or other activity with various videos at the video website. In addition to events, user data (e.g., a user's age, gender, and location) and other user attributes (e.g., the number of users who subscribe to the audience member) may be queried for each audience member. The gathered data and/or events for each audience member may be presented in a visual display. The display may comprise a table or a graph.

For example, a user (e.g., a video content creator) who is interested in learning more about the engaged audience members for a channel of videos or a set of videos associated with a certain topic (e.g., brand name) may submit a criterion for the videos. Then based on the submitted criterion, a set of audience members that have previously engaged with the relevant videos is identified. Furthermore, data associated with the audience members is retrieved and is made available in an easy to consume presentation.

In some embodiments, based on the data retrieved for each audience member, an influence score is determined for each audience member. The influence score correlates with how much sway the audience member has with respect to users of a community of users (e.g., with the video website and/or across different social network platforms). Using the determined influence scores, influential audience members (e.g., audience members who have an influence score above a certain threshold influence score) may be determined. Subsequently, when a new engagement by an influential audience member with respect to any video of the set of videos is detected, an alert is sent (e.g., to a user associated with monitoring the set of videos so that the user may be informed of the engagement, which might otherwise be overlooked if there are numerous engagements submitted by various audience members).

FIG. 1 is a diagram showing an embodiment of a system for determining a video audience. In the example, system 100 includes client device 102, network 104, video server 106, message broker server 108, and audience server 110. In some embodiments, message broker server 108 is not included in the system. Network 104 is implemented using high-speed data and/or telecommunications networks. In the example, client device 102, network 104, video server 106, message broker server 108, and audience server 110 communicate to each other over network 104.

Video server 106 supports a video sharing website at which a community of users may upload videos and/or engage with videos. For example, the video website allows users to create accounts at the website. In some embodiments, a video channel may be associated with a particular user and include one or more videos uploaded by the user. The user uploaded videos (and associated metadata) may be stored at a video database maintained by video server 106. For example, a first user may subscribe to the videos of a second user and become notified whenever the second user uploads a new video. Video server 106 may store information associated with the users (e.g., in a user database) and the events that the users perform with respect to different videos. Data stored for a user may include the user's user identification (e.g., user name), the user's gender, the user's location, the user's contact information, the user's subscriptions to which video channels, identifying information associated with videos that the user has uploaded to his or her video channel, the number of views of the uploaded videos, and identifying information associated with the users that subscribe to the user's own video channel, for example. Events stored for a user may include the user's preference activity (e.g., user selections to indicate that the user likes or favorites a particular user comment or video), the user's posted comments (e.g., associated with various videos), the user's selection of adding a video to a saved playlist, the user's selection to subscribe to a video channel, and the user's selection to share a video with another user, for example.

A user may desire to determine which users comprise the engaged audience members of a particular set of videos that satisfy a criterion submitted by the user. To initiate the process of determining such audience members, the user may use client device 102 to access an audience determination service (located at a particular website) provided by audience server 110. While client device 102 is shown to be a laptop computer in the example, other examples of client device 102 are a desktop computer, a mobile device, a tablet device, a smart phone, and any other computing device.

For example, the user may access the audience determination service using a web browser application executing at client device 102 to access the web address (e.g., www.tubularlabs.com) associated with the audience determination service provided by audience server 110. Then, the user may submit a set of criteria associated with the set of videos for which the user wishes to determine the audience members. For example, the set of criteria may include identifying information associated with a video website and one or more keywords. Audience server 110 is configured to identify a set of videos based on the set of criteria. For example, if the set of criteria included identifying information associated with the video website associated with video server 106 and also one or more keywords, audience server 110 would query video server 106 for videos that match the one or more keywords. In various embodiments, querying may include sending a call to an application programming interface (API) associated with video server 106 and/or performing crawling of webpages associated with video server 106. In some embodiments, metadata for each matching video including, for example, the number of views and the number of user comments, is also returned to audience server 110.

In some embodiments, audience server 110 does not send certain queries directly to video server 106 and instead sends them to message broker server 108, which sends one or more queries to video server 106 on behalf of audience server 110. Message broker server 108 is configured to generate multiple queries based on a single request received from audience server 110 and send the queries either serially or at least partially in parallel to video server 106. The queried data returned by video server 106 may be sent directly back to audience server 110 or at least temporarily maintained at message broker server 108. One benefit to using message broker server 108 to send queries to video server 106 is to maintain a consistent rate of workload associated with sending multiple queries to a different server. For example, if in response to each call, the API associated with video server 106 can return only a portion of all the desired data, then message broker server 108 can be used to efficiently, by audience server 110, generate a set of calls to obtain various portions of the desired data until all the desired data is returned by the calls. Then the desired data can be received and processed by audience server 110.

Once audience server 110 has determined the set of videos that matches the received criterion, audience server 110 is configured to query (e.g., a video database of) video server 106 for the stored user engagements corresponding to each video of the set of videos. In one embodiment, engagements comprise user comments. However, engagements other than user comments may be used as well. In some embodiments, audience server 110 is configured to use message broker server 108 to make calls to the API associated with video server 106 to return user comments for each of the videos in the set. In some embodiments, at least some returned user comments are structured such that different portions (e.g., the user name of the commentator, the date of posting, the body of the comment) are included with the user comments and in some embodiments, at least some returned user comments are unstructured strings of text that need to be parsed into different portions (e.g., the user name of the commentator, the date of posting, the body of the comment).

Audience server 110 is configured to determine user identities (e.g., user names) associated with all the returned user comments associated with the set of videos. For example, audience server 110 may parse and/or extract the user names of all the returned user comments for each video in the set and perform deduplication to determine the set of unique user identities. In various embodiments, the set of user identities comprise the set of audience members for the set of videos. The set of audience members represent the list of users at the video website(s) that have previously engaged, at least once, with at least one video in the identified set of videos.

Audience server 110 is configured to query (e.g., a user database of) video server 106 to gather data and/or events for each audience member in the set of audience members. For example, the data may include profile data (e.g., age, gender, location), the audience member's contact information, the audience member's subscriptions to which video channels, identifying information associated with videos that the audience member has uploaded to his or her video channel, the number of times that users have watched the uploaded videos, and identifying information associated with the users that subscribe to the audience member's own video channel. For example, events may include the audience member's preference activity (e.g., user selections to indicate that the audience member likes or favorites a particular user comment or video), the audience member's posted comments (e.g., associated with various videos), the audience member's selection of adding a video to a saved playlist, the audience member's selection to subscribe to a video channel, and the audience member's selection to share a video with another user. In some embodiments, audience server 110 is configured to use message broker server 108 to make calls to the API associated with video server 106 to return data and/or events stored for each of the audience members in the set. In some embodiments, audience server 110 is further configured to query databases associated with different social networks to gather events stored by those servers so as to compile data for each audience member across various platforms. In some embodiments, audience server 110 is configured to present a display associated with the set of audience members using at least some of the gathered data and/or events.

In some embodiments, audience server 110 is configured to determine an influence score for each audience member based on at least some of the data and/or events gathered for the audience member. Based on the respective influence scores of the audience members, audience server 110 is configured to determine at least a subset of the set of audience members as influential audience members. Subsequently, audience server 110 may determine that an engagement is received with respect to a video of the set of videos and then send an alert to a specified user so that the user can take action with respect to the engagement from the audience member who has been identified as being influential.

Audience server 110 provides users a tool to determine audience members of a set of videos and to learn information associated with each individual audience member. For example, if a user wanted to determine the audience members for videos associated with a particular brand name, he or she can submit the brand name as a criterion to the audience determination service. Or if the user wanted to determine the audience members for video associated with a particular topic, he or she can simply submit keywords associated with the topic to the audience determination service. In yet another example, if the user wanted to determine the audience members of one or more video channels, he or she can submit keywords associated with such video channel(s). Audience server 110 also enables users to become aware of potentially important engagements from influential audience members from among, potentially, numerous engagements that are received from various audience members of varying influence. Therefore, users may use the audience determination service to better understand audience members of a set of videos and also to better interact with the audience members.

Figure 2:
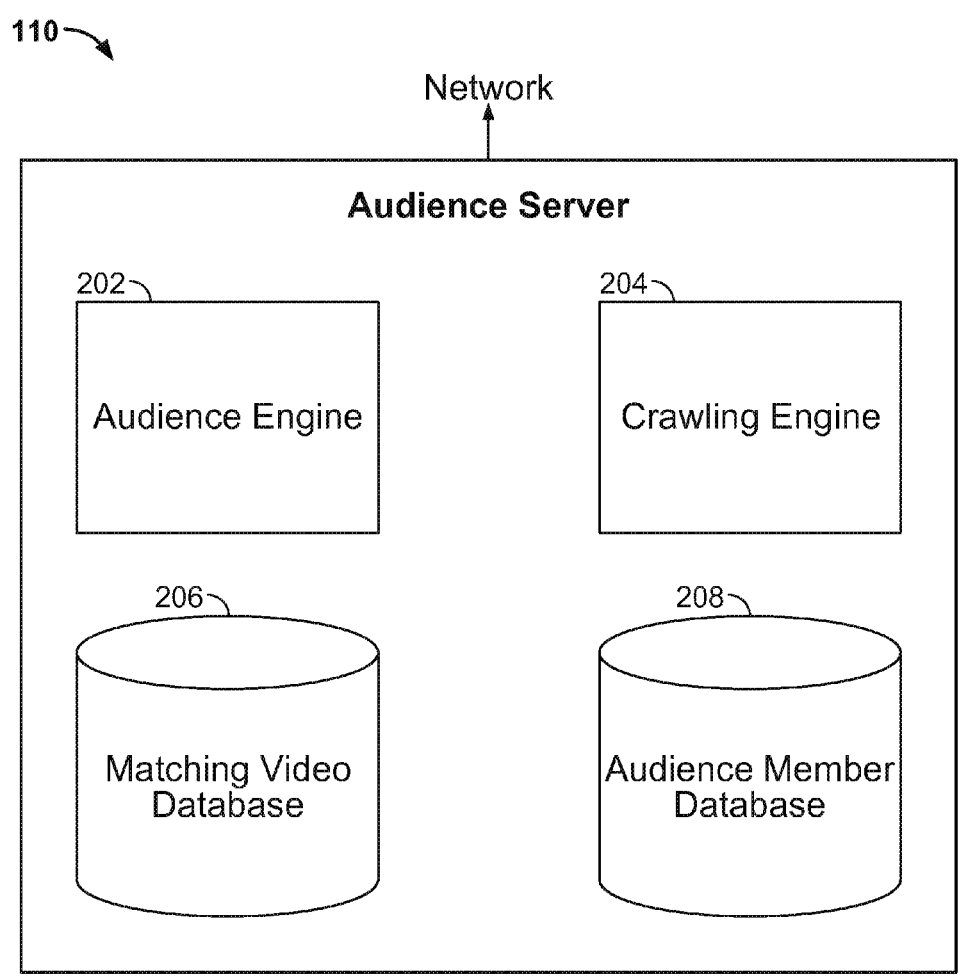
FIG. 2 is a diagram showing an example of an audience server.

FIG. 2 is a diagram showing an example of an audience server. In some embodiments, audience server 110 of system 100 of FIG. 1 is implemented with the example of FIG. 2. In the example, the audience server includes audience engine 202, crawling engine 204, matching video database 206, and audience member database 208. Each of audience engine 202 and crawling engine 204 may be implemented with one or both of hardware and software. Each of matching video database 206 and audience member database 208 may be implemented with one or more databases. In some embodiments, one of the matching video database 206 and audience member database 208 is included in an Audience Graph, which comprises information associated with audience members, video topics, video channels, and shows, etc., that are determined from one or more video websites by an audience server such as the audience server of FIG. 2. In some embodiments, both matching video database 206 and audience member database 208 are included in the Audience Graph.

Audience engine 202 is configured to receive criteria associated with a set of videos for which engaged audience members are to be determined. In some embodiments, the set of criteria is received through a user interface associated with the audience member determination server that is provided by the audience server. For example, the user interface is a website. For example, the criteria includes identifying information associated with one or more video websites (or other type(s) of websites) and a set of one or more keywords. Audience engine 202 is configured to query video databases corresponding to the identifying information of video website(s) included in the criteria for those videos that match the one or more keywords included in the criteria. The keywords may relate to the names of individual videos, the names of video channels, the tags associated with videos, the categories associated with videos, the user names of users who uploaded the videos, and/or other metadata that is associated with videos. Videos (from the one or more video websites) whose metadata matches the keyword(s) of the criteria are identified. In some embodiments, audience engine 202 stores data related to the identified matching videos at matching video database 206. Examples of data stored with each matching video may include a web address (e.g., a uniform resource locator) associated with the video, metadata associated with each video (e.g., the name of the video, the name of the associated video channel, the tags associated with the video, the categories associated with the video, the time that the video was uploaded to the website), the current number of views associated with the video, and the current number of user comments associated with the video. In some embodiments, instead of querying the video databases of video websites directly, audience engine 202 is configured to send a request to an intermediary, such as a message broker service, for the intermediary to send a set of calls to the API(s) of the video website(s) to obtain the set of matching videos. In some embodiments, in addition or alternative to querying by audience engine 202, crawling engine 204 is configured to retrieve at least a subset of the set of matching videos by crawling the video website(s) identified by the criteria. For example, the API calls may only provide a subset of the information available about a video but additional information (that is not available to be obtained via API calls) may be available on the web page associated with the video itself. So crawling engine 204 is used to fetch data from the user facing web page of the video as well.

Once the set of matching videos have been identified, audience engine 202 is configured to query the video databases associated with the video websites for engagements associated with each video of the set of videos. In some embodiments, in addition or alternative to querying by audience engine 202, crawling engine 204 is configured to retrieve at least a subset of the set of matching videos by crawling the video website(s) identified by the criteria. Engagements may comprise any type of stored user engagement for the video. One example of the engagement is a user comment. For example, the user comment is a text and/or media-based message that is submitted by a user for the video. In various embodiments, each user comment includes identifying information associated with the user who submitted the comment. In some embodiments, audience engine 202 is configured to query the video database for all user comments stored for each video of the identified set of matching videos. In some embodiments, audience engine 202 is configured to send a request to an intermediary, such as a message broker service, for the intermediary to send a set of calls to the API(s) of the video website(s) to obtain the stored user comments stored for each video of the identified set of videos. In some embodiments, the returned user comments are parsed and/or the user names of all the returned user comments are extracted and deduplication is performed on the user names to determine the set of unique user identities. In various embodiments, the set of user identities comprise the identified set of audience members for the set of videos. In some embodiments, identifying information associated with each audience member is stored at audience member database 208.

Audience engine 202 is configured to collect data and/or events associated with each of the audience members from the identified set of audience members. Audience engine 202 is configured to collect data and/or events associated with the audience members to compile user profiles and behavior patterns. In some embodiments, audience engine 202 queries user database(s) associated with the video websites (that were identified in the criteria) (and in some embodiments, also user databases associated with various social networks) for audience member profile data such as, for example, the audience member's gender, the audience member's location, the audience member's contact information, the audience member's subscriptions to which video channels, identifying information associated with videos that the audience member has uploaded to his video channel, the number of views of the uploaded videos, and identifying information associated with the users that subscribe to the audience member's own video channel. In some embodiments, audience engine 202 is configured to query for events associated with the audience member such as, for example, the audience member's preference activity (e.g., user selections to indicate that the user likes or favorites a particular user comment or video), the audience member's posted comments (e.g., associated with various videos), the audience member's selection of adding a video to a saved playlist, the audience member's selection to subscribe to a video channel, and the audience member's selection to share a video with another user. In some embodiments, in addition or alternative to querying by audience engine 202, crawling engine 204 is configured to retrieve at least a subset of the set of matching videos by crawling the video website(s) identified by the criteria. In some embodiments, audience engine 202 is configured to send a request to an intermediary, such as a message broker service, for the intermediary to send a set of calls to the API(s) of the video website(s) to obtain the stored data and/or events associated with each audience member of the identified set of audience members. In some embodiments, the returned data and/or events for each audience member is stored with identifying information associated with that audience member at audience member database 208.

In some embodiments, crawling engine 204 is configured to crawl the webpage associated with each video of the set of matching videos to determine an attribution network video category, if any, associated with the video. In some instances, an online video that is associated with a particular network may be treated differently than an online video that is not associated with a network. For example, a network at a video website may offer a different revenue sharing scheme to users who upload videos at the website than the default revenue sharing scheme of the video website.

Audience engine 202 is configured to render at least some data stored at audience member database 208 for each audience member in a visual display. For example, the visual display may be accessible via a webpage associated with the audience determination service. The visual display may comprise a graph or a table, for example. The visual display may show the user name of each audience member, the number of events or engagements that the audience member has made with respect to any videos of the set of matching videos, the number of videos of the set of matching videos that the audience member has engaged with, among other information. In some embodiments, the visual display may be shown in a user interface through which a user may select manipulation of the visual display (e.g., by choosing certain filters associated with the audience members and choosing to view more information on any particular audience member).

In some embodiments, audience engine 202 is configured to determine an influence score for each audience member of the set of audience members based on one or more factors derived from the data and/or events gathered for the audience member. The influence score for an audience member represents the impact that the audience member has within the user community of the video website(s). For example, an audience member with many subscribers will have a higher influence score. Also for example, an audience member with a higher rate of new subscriptions will also have a higher influence score. In another example, an audience member whose own video(s) have received numerous views will have a higher influence score. In some embodiments, audience engine 202 is configured to determine at least a subset of the set of audience members as influential audience members. For example, a system administrator can set a threshold influence score and if the influence score determined for a particular audience member exceeds the threshold influence score, then the audience member is considered an influential audience member. In another example, audience engine 202 ranks the set of audience members based on their respective influence scores and chooses the top N (e.g., 10) audience members as influential audience members. Data associated with being an influential audience member may be stored for each such audience member at audience member database 208.

In some embodiments, a system administrator configures an alert condition such that when the alert condition is met, an alert is sent (e.g., via email or to the audience determination user interface) to the system administrator (or another user). For example, the alert condition can be configured to be when a subsequent event or engagement is received from an audience member who is determined to be an influential audience member. In another example, the alert condition can be configured to be when a subsequent event or engagement is received from an audience member associated with a particular attribute (e.g., has more than one thousand subscribers).

In some embodiments, audience engine 202 is configured to periodically query the video website(s) to determine whether any updates have been made with respect to a video from the set of matching videos or to an audience member of the set of audience members. In the event that an update to a video or to an audience member is determined, then data stored for the updated video is updated at matching video database 206 or data stored for the audience member is updated at audience member database 208, respectively.

Figure 3:
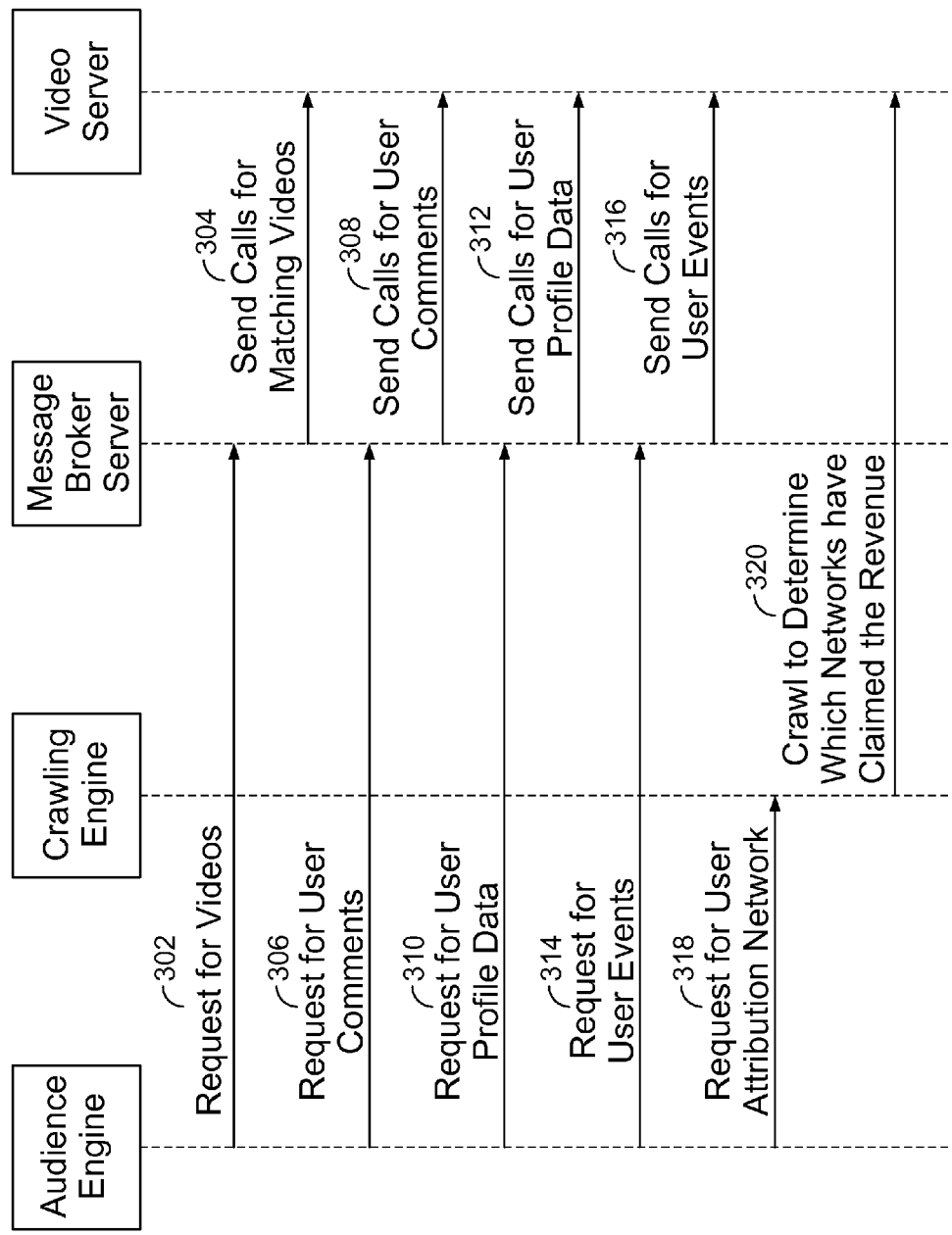
FIG. 3 is a sequence diagram showing an embodiment of determining an audience.

FIG. 3 is a sequence diagram showing an embodiment of determining an audience. In some embodiments, the sequence diagram of the example is implemented at system 100 of FIG. 1.

At 302, the audience engine sends a request for videos to the message broker server. The request may include criteria that include identifying information associated with a video website and one or more keywords. At 304, the message broker server sends (e.g., API) calls for matching videos to the video server (associated with the video website identified in the criteria). In some embodiments, based on the configuration of an API, each call for matching videos may only retrieve information associated with at most a predetermined number of videos. For example, each API call for videos that match one or more keywords is configured to return information associated with a maximum of 100 videos. As such, the message broker server will send a set of calls to the video server and in return, the video server will return information associated with at least a portion of the set of matching videos for each call. For example, assume that there are 394 videos at the video server that match the keyword(s) of the criteria. For purposes of illustration, each video is identified by a number 1 through 394. Also, assume that information associated with at most 100 videos may be returned per each API call from the video server. The message broker server may create a thread to perform each API call. In the example, 10 such calls will be created, where the first call will return information on videos 1 through 100, the second call will return information on videos 101 through 200, the third call will return information on videos 201 through 300, and the fourth call will return information on videos 301 through 394. The information on the found videos may be returned to the audience engine by the video server or by the video server to the message broker server, which will in turn return the video information to the audience server.

At 306, the audience engine sends a request for user comments to the message broker server. In some embodiments, a request may be sent to obtain the user comments for each video in the identified set of videos. At 308, the message broker server sends (e.g., API) calls for user comments to the video server. In some embodiments, based on the configuration of an API, each call for user comments associated with a video may only retrieve at most a predetermined number of user comments. For example, each API call for user comments of a video is configured to return a maximum of 50 user comments. As such, the message broker server will send a set of calls to the video server and in return, the video server will send at least a portion of all user comments stored for a video for each call. Returning to the previous example, there are 394 videos at the video server that match the keyword(s) of the criteria. For video 1, there are 2,042 user comments. For purposes of illustration, each user comment for video 1 is identified by a number 1 through 2,042. The message broker server may create a thread to perform each API call. In this example, 41 such calls to retrieve the user comments for video 1 will be created. The first call for video 1 will return comments 1 through 50, the second call for video 1 will return comments 51 through 100, and so forth. The message broker server will make similar sets of calls for videos 2 through 394. The queried user comments may be returned to the audience engine by the video server or by the video server to the message broker server, which will in turn return the user comments to the audience server.

While not shown in the example, in some embodiments, the crawling engine is also used in retrieving user comments from the video server. The crawling engine may be used in the event that the API associated with the video server supports returning only a predetermined number (e.g., a subset) of the most recently posted user comments and so there may be older user comments that cannot be retrieved using the API. As such, the crawling engine can be used to retrieve the user comments that cannot be retrieved by the API by crawling the web pages associated with videos for which less than all the of the user comments can be returned via API calls. Returning to the previous example, the API is configured to only return the most recent 1,000 user comments posted for a video. Because there are 2,042 user comments stored for video 1, user comments 1 through 1,000 may be returned via the API but user comments 1,001 through 2,042 cannot be returned via the API. Therefore, the crawling engine may crawl for user comments 1,001 through 2,042 at the webpage(s) associated with video 1. In some embodiments, the user comments returned by the API may be structured while the user comments returned by the crawling engine may be unstructured.

The audience server will extract unique user names from the returned user comments for all the videos. In some embodiments, the unique user names will form the set of audience members.

At 310, the audience engine sends a request for user profile data to the message broker server. In some embodiments, a request may be sent to obtain the user profile data associated with each audience member of the identified set of audience members. For example, the request may include identifying information (e.g., a user name) associated with each audience member. At 312, the message broker server sends (e.g., API) calls for user profile data to the video server. In some embodiments, the message broker server sends an API call for each audience member or an API call for all audience members to retrieve user profile data. For example, user profile data may include the audience member's gender, the audience member's location, the audience member's contact information, the audience member's subscriptions to which video channels, identifying information associated with videos that the audience member has uploaded to his video channel, the number of views of the uploaded videos, and identifying information associated with the users that subscribe to the audience member's own video channel. The user profile data may be returned to the audience engine by the video server or by the video server to the message broker server, which will in turn return the user profile data to the audience server.

At 314, the audience engine sends a request for user events to the message broker server. In some embodiments, a request may be sent to obtain the user events associated with each audience member of the identified set of audience members. For example, the request may include identifying information (e.g., a user name) associated with each audience member. At 316, the message broker server sends (e.g., API) calls for user events to the video server. In some embodiments, the message broker server sends an API call for each audience member or an API call for all audience members to retrieve user events. For example, user events may include an audience member's preference activity (e.g., user selections to indicate that the audience member likes or favorites a particular user comment or video), the audience member's posted comments (e.g., associated with various videos), the audience member's selection of adding a video to a saved playlist, the audience member's selection to subscribe to a video channel, and the audience member's selection to share a video with another user. The user events may be returned to the audience engine by the video server or by the video server to the message broker server, which will in turn return the user events to the audience server.

At 318, the audience engine sends a request for the user attribution network to the crawling engine. In some embodiments, a request may be sent to obtain identifying information associated with any networks associated with the video website with which a video of the identified set of video is associated. In some embodiments, a request may also be sent to obtain identifying information associated with any networks associated with the video website with which a video uploaded by an identified audience member is associated. At 320, the crawling engine is configured to crawl the video webpages associated with the identified set of videos to determine if any network has claimed the revenue associated with the video webpages.

Figure 4:
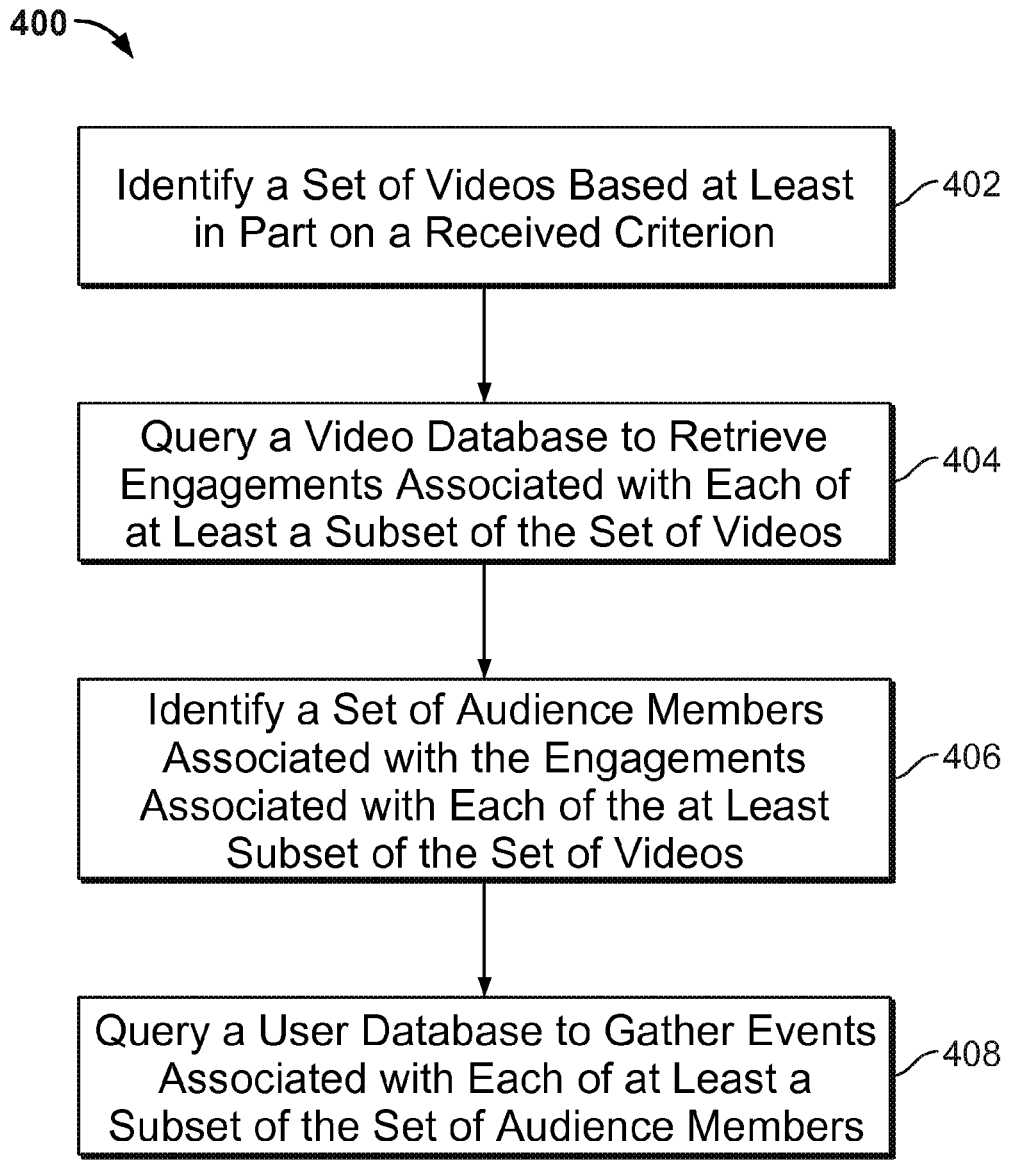
FIG. 4 is a flow diagram showing an embodiment of a process for determining a video audience.

FIG. 4 is a flow diagram showing an embodiment of a process for determining a video audience. In some embodiments, process 400 is implemented at system 100 of FIG. 1.

At 402, a set of videos is identified based at least in part on a received criterion. For example, the criterion may include identifying information of a video website and/or one or more keywords. A set of videos whose metadata matches the keyword(s) is identified.

At 404, a video database is queried to retrieve engagements associated with each of at least a subset of the set of videos. For each of the identified videos, user engagements stored for the video are queried for at a video database associated with the video website. For example, user engagements stored for the video may include user comments.

At 406, a set of audience members associated with the engagements associated with each of the at least subset of the set of videos is identified. The returned user comments are parsed and a user name is extracted from each user comment. In some embodiments, deduplication is performed on the set of extracted user names to obtain a unique set of user names. The unique set of user names is used as the identified set of audience members for the identified set of videos.

At 408, a user database is queried to gather events associated with each of at least a subset of the set of audience members. Additional information is queried for each audience member, including user profile data and/or events associated with the audience members. In some embodiments, the user database and the video database comprise the same database. In some embodiments, at least some of the information queried for each audience member is presented in a visual display with the user names of the corresponding audience members.

Figure 5:
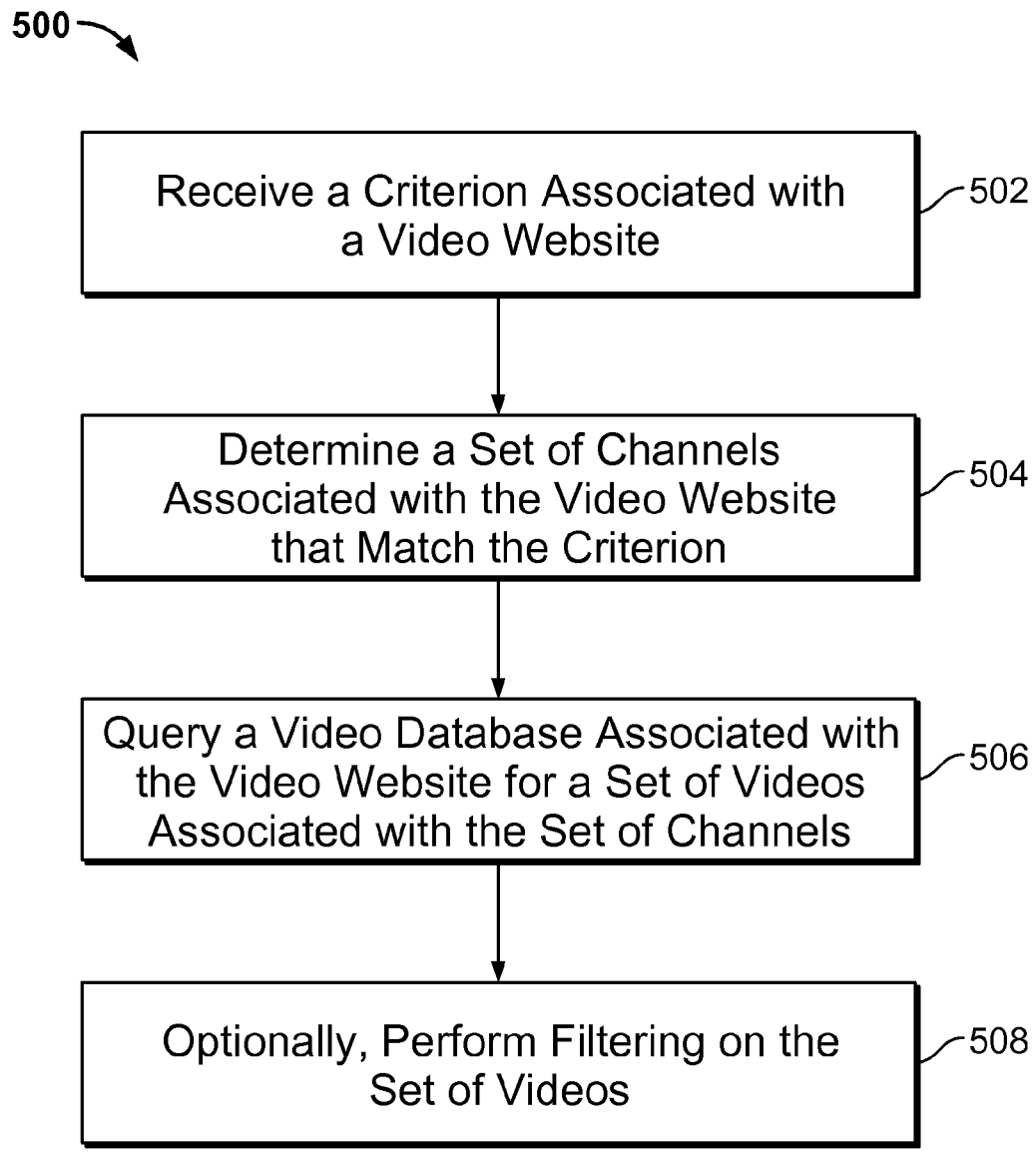
FIG. 5 is a flow diagram showing an embodiment of a process for identifying a set of videos.

FIG. 5 is a flow diagram showing an embodiment of a process for identifying a set of videos. In some embodiments, 402 of process 400 of FIG. 4 is implemented with process 500. In some embodiments, process 500 is implemented at system 100 of FIG. 1.

Process 500 illustrates an example of identifying a set of videos at a video website by first finding a set of video channels that match the given criterion.

At 502, a criterion associated with a video website is received. In some embodiments, one or more particular video websites are already selected (e.g., at a user interface associated with the audience determination service). The criterion may include a set of one or more keywords. At 504, a set of channels associated with the video website that match the criterion is determined. The set of one or more keywords are compared against all video channels to find those video channels that match the keyword(s). At 506, a video database associated with the video website is queried for a set of videos associated with the set of channels. Then videos associated with the determined set of video channels are queried for. In some embodiments, a video channel may be associated with one or more videos. For example, the video channel may serve as a theme or a category of video or associated with a user account. At 508, optionally, filtering is performed on the set of videos. In some embodiments, filtering is performed on the set of videos to filter one or more videos to exclude from the set. For example, based on keyword matching, some videos that are not actually associated with the topic associated with the keywords may be found. In some embodiments, a user (e.g., associated with submitting the criterion) is shown the set of videos and may select one or more of the videos to be excluded from the set. In some embodiments, automatic techniques of filtering out videos of lower relevance from the set may be used as well.

Figure 6:
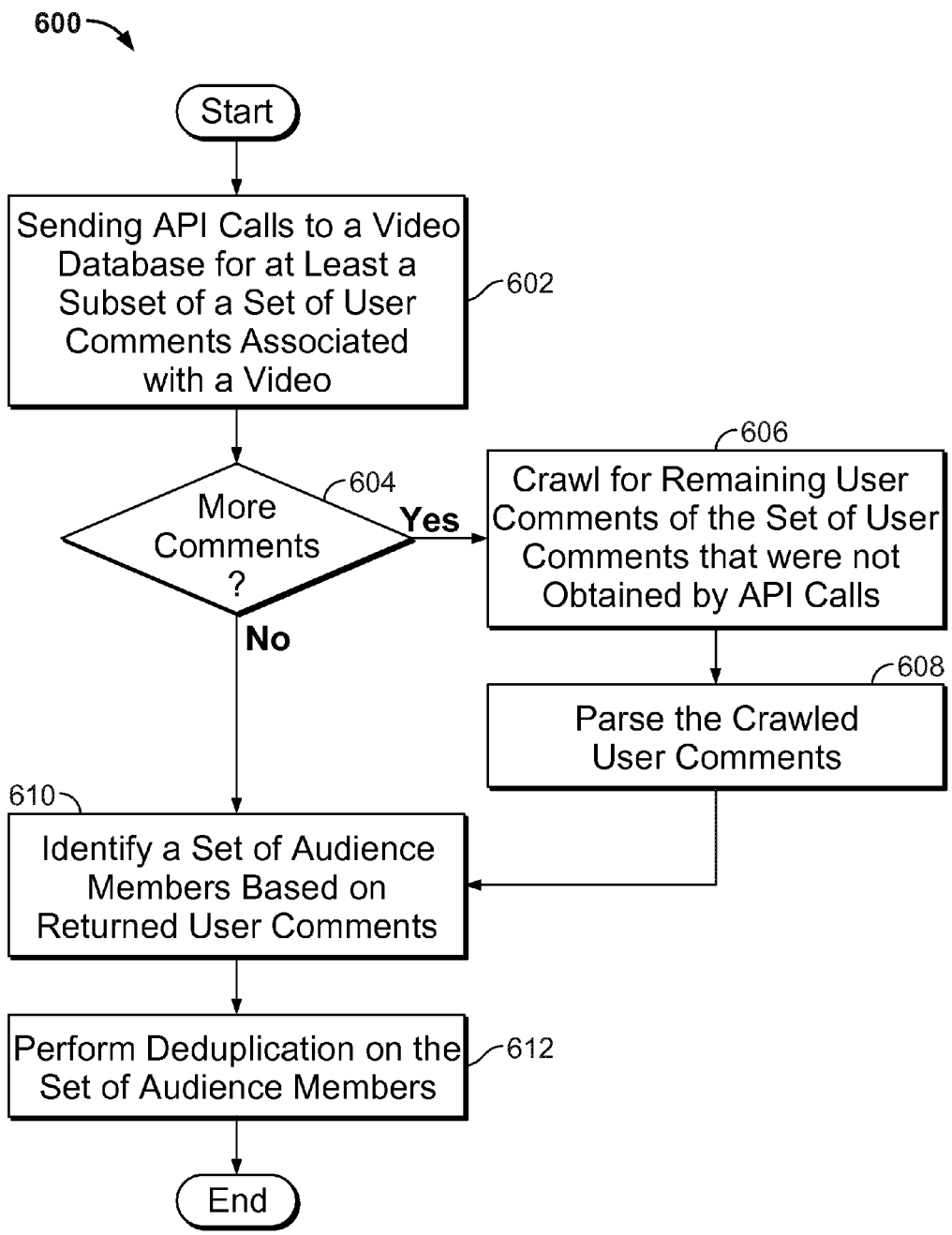
FIG. 6 is a flow diagram showing an embodiment of a process for querying a video database to retrieve engagements associated with a video.

FIG. 6 is a flow diagram showing an embodiment of a process for querying a video database to retrieve engagements associated with a video. In some embodiments, 404 and 406 of process 400 of FIG. 4 are implemented, at least in part, using process 600. In some embodiments, process 600 is implemented at system 100 of FIG. 1.

Process 600 illustrates an example of retrieving engagements associated with a video, where the engagements comprise user comments. In some embodiments, process 600 may be repeated for each video in the set of videos identified by a process such as process 500 of FIG. 5.

At 602, API calls are sent to a video database for at least a subset of a set of user comments associated with a video. For example, the video is associated with a video website and has been determined to match a criterion. The video database maintained by a video server associated with the video database is queried for at least some of the user comments stored for the video. For example, a returned user comment may include a user name, a date at which the comment was posted, and the text/media associated with the comment. At 604, it is determined whether there are more user comments to retrieve. In some instances, only a limited number of recent user comments stored for a video may be returned via API calls. As such, the remaining user comments that cannot be called using the API may be obtained via crawling the webpage(s) associated with the identified videos. For example, if there are 1,400 comments associated with a certain video and only the 1,000 most recent user comments may be obtained by API calls, then the remaining 400 user comments must be obtained via crawling. In the event that it is determined that there are more comments to retrieve, control passes to 606. Otherwise, in the event that it is determined that there are no more comments to retrieve (e.g., all user comments have been obtained via API calls), control passes to 610. At 606, remaining user comments of the set of user comments that were not obtained by sending API calls are obtained by crawling the webpage(s) associated with the video. At 608, the crawled user comments are parsed. In some embodiments, the user comments obtained by API calls are returned in a data structure (e.g., various portions of user comments returned in data structures are labeled) while the user comments returned by crawling are not included in a data structure (e.g., user comments that are not included in data structures form strings of text). As such, the user comments obtained by crawling are parsed into various portions (e.g., a user name, a date at which the comment was posted, and the text/media associated with the comment). At 610, a set of audience members is identified based on returned user comments. In some embodiments, user names are extracted from the user comments obtained by either or both of sending API calls and crawling. For example, a user name is extracted from each user comment. The extracted set of user names comprise the set of audience members associated with the video. At 612, deduplication is performed on the set of audience members. Deduplication is performed on the set of audience members to ensure that the set of user names includes only unique users. For example, the same audience member may have submitted multiple user comments for a video and so deduplication will ensure that the audience member is determined as only one audience member. For example, deduplication is performed for audience members determined across various videos in the identified set of videos.

Figure 7:
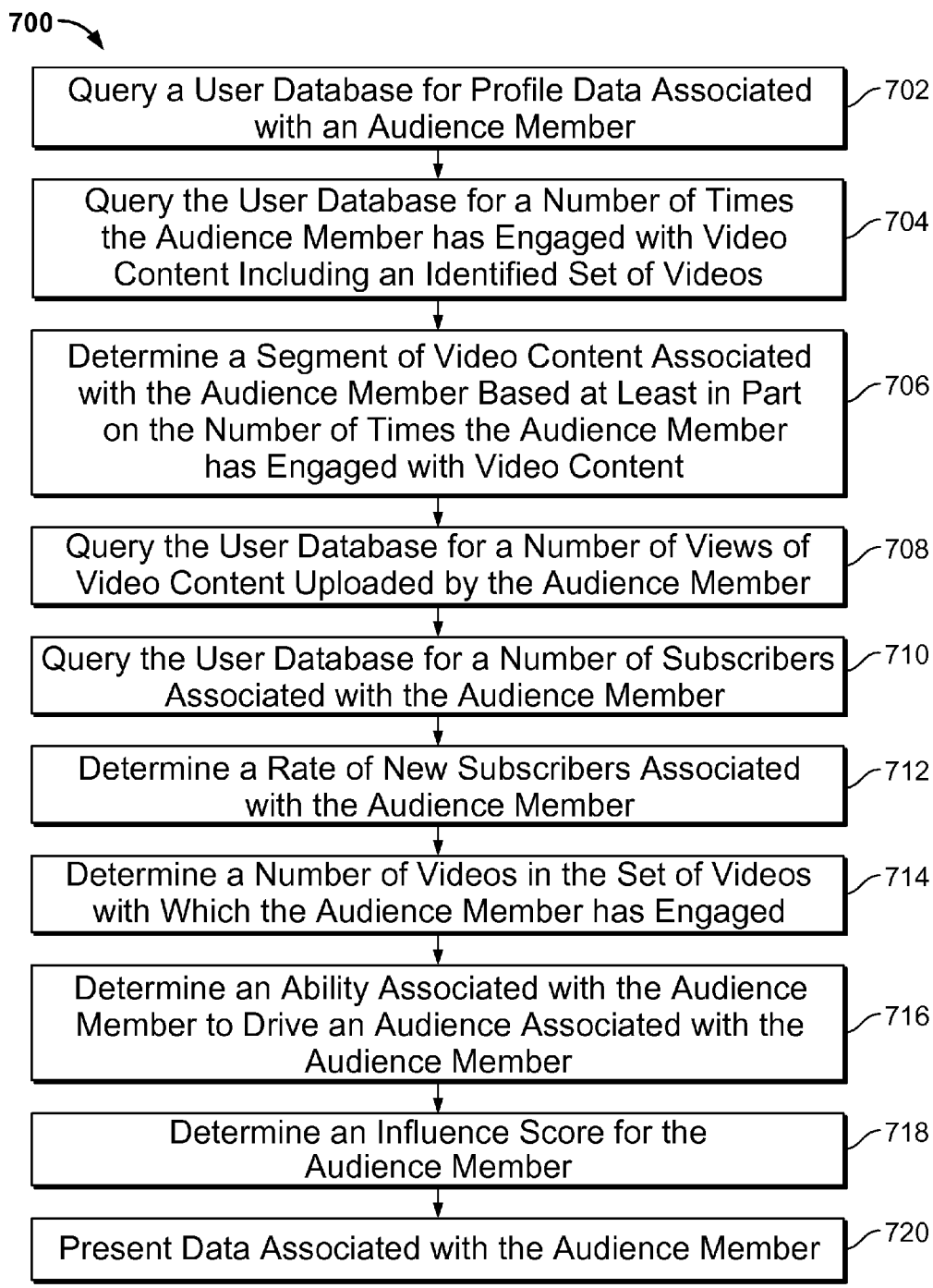
FIG. 7 is a flow diagram showing an embodiment of a process for querying a user database to gather events associated with an audience member.

FIG. 7 is a flow diagram showing an embodiment of a process for querying a user database to gather events associated with an audience member. In some embodiments, 408 of process 400 of FIG. 4 is implemented, at least in part, using process 700. In some embodiments, process 700 is implemented at system 100 of FIG. 1.

Process 700 illustrates an example of gathering information for an audience member. In some embodiments, process 700 may be repeated for each audience member identified by a process such as process 600 of FIG. 6.

At 702, a user database is queried for profile data associated with an audience member. The user database associated with the video website is queried for profile data on the audience member, who is identified by the audience member's user name at the video website. For example, profile data may include the audience member's name, age, location, contact information (e.g., email address), and user names corresponding to various social networks to which the audience member is a member. In some embodiments, user databases associated with website(s) other than the video website are also queried for profile data. For example, user databases of corresponding social network websites are also queried for profile data. The audience member's respective user names at the social network websites may be identified from the profile data stored by the user database maintained by the video website.

At 704, the user database is queried for a number of times the audience member has engaged with video content including an identified set of videos. The user database associated with the video website may be queried to determine the audience member's historical engagements with various videos at the video website. Some examples of user engagements with videos include a user's selection of liking a video, a user's selection of adding a video as a favorite video, a user's selection to add a video to a saved playlist, a user's submission of a comment for a video, and a user's selection to subscribe to another user. In some embodiments, engagements stored for the audience member with respect to any video, including videos that are included or not included in the set determined by a process such as process 500 of FIG. 5, are retrieved. The historical engagements of the audience member may be analyzed to not only determine the audience member's degree of interest with respect to the videos in the identified set but also to determine the audience member's degree of interest in videos other than those in the identified set. For example, based on the audience member's obtained engagements, other video topics/video categories/video channels that the audience member is interested in may be determined as well.

At 706, a segment of video content associated with the audience member is determined based at least in part on the number of times the audience member has engaged with video content. Furthermore, a propensity of the audience member to perform a certain activity may also be determined from the user profile data and/or engagements. A segment to which the audience member belongs may be determined from at least the user profile data and/or the retrieved engagements. For example, a segment may comprise a user demographic category to which the user belongs. Being in the user demographic of male and between the ages of 19-34 may be a segment that is determined for the audience member. In another example, a segment may comprise a topic of videos or video channels that the audience member is interested in. For example, based on the audience member's retrieved user engagements with respect to the video content, the topics associated with the videos or video channels may be determined and the topics associated with the identified set of videos and topics associated with videos other than the identified set of videos may be determined. Some examples of video topics include mascara, vlogger, call of duty, parody, late night tv, romantic comedy movie, and thriller movie. For instance, the audience member may be determined to be interested in a particular video topic if it is determined that the audience member has a higher than a benchmark index propensity of watching videos associated with that video topic. The video topics other than the topics associated with the videos in the identified set of videos may be included in a presented list of videos associated with "topics audience also watches." For example, given that the identified set of videos is associated with the topic of beauty, it may be useful for an account administrator to be able to see which other topics of videos that the audience of the identified set of videos are also watching (e.g., romantic comedy trailers, talk show videos, fashion videos). In some embodiments, segments and/or propensities determined for the set of audience members associated with the set of videos may be helpful in determining which types of ads to serve at the webpages corresponding to the videos.

At 708, the user database is queried for a number of views of video content uploaded by the audience member. The user database (or a video database) associated with the video website is queried for the number of views of one or more videos uploaded by the audience member. For example, the audience member may or may not share/upload content at the video website as well. If the audience member is determined to share content, then how many views the audience member's uploaded content has received is queried for.

At 710, the user database is queried for a number of subscribers associated with the audience member. The user database associated with the video website is queried for the number of subscribers that the audience member has. In some embodiments, user databases associated with other websites other than the video website are also queried. For example, user databases of corresponding social networks may be queried for the number of the audience member's followers, subscribers, friends, connections, and/or other social network-based relationships. In some embodiments, each data associated with a subscriber for the audience member also include time information regarding when the subscribing user started subscribing to the audience member.

At 712, a rate of new subscribers associated with the audience member is determined. In some embodiments, the rate of new subscribers for the audience member is determined. The rate of new subscribers represents how quickly the audience member's own shared content at the video website is gaining attention from the video website community. For example, an audience member who has only recently joined the video website but may be quickly gaining subscribers may be an indicator of the audience member's influence. The rate of new subscribers may be determined by using the time information associated with the subscriber information obtained at 710.

At 714, a number of videos in the set of videos with which the audience member has engaged is determined. For example, the number of videos in the identified set of videos with which the audience member has engaged may be determined by finding the unique number of videos from the identified set of videos among the user engagements determined for the user at 704.

At 716, an ability associated with the audience member to drive an audience associated with the audience member is determined. In some embodiments, the ability of the audience member to drive the audience member's own audience (e.g., which may comprise the audience member's subscribers at the video website and/or the set of users that have engaged with the audience member's shared content) can be quantified as a value, where a higher value suggests that the audience member has a stronger ability to drive the interest of his or her audience and where a lower value suggests that the audience member has a weaker ability to drive the audience. Process 800 of FIG. 8 below describes an example of determining an audience member's ability to drive his or her audience.

At 718, an influence score is determined for the audience member. In some embodiments, an influence score is determined for the audience member to represent the audience member's significance at the video website and/or other social network websites. A higher influence score represents a stronger influence and a lower influence score represents a lower influence. In some embodiments, the influence score for the audience member is determined based at least in part on the information determined above, such as, for example, the number of engagements the audience member has made with video content, the segment to which the audience member belongs, the number of views that content shared by the audience member has received, the rate of new subscribers for the audience member, and the audience member's ability to drive his or her audience. Another example of a factor that can be used to determine the influence score for the audience member is the amount of influence that the audience member's own audience has. The audience of the audience member may comprise the subscribers and/or users who have engaged with the video content shared by the audience member.

In some embodiments, the audience member may be deemed as an influential audience member based on his or her influence score. For example, a subset of a set of audience members for the identified set of videos may be selected as influential members based on their respective influence scores. An example technique of selecting a subset of influential audience members may be to rank the audience members by their respective influence scores and determine the N (e.g., 10) highest ranking audience members to be influential audience members. Another example technique of selecting a subset of influential audience members may be to set a threshold influence score such that an audience member whose influence score exceeds the threshold score will be deemed an influential audience member. As will be described in further detail below, an alert may be sent to a user when an influential audience member has made an engagement with a video associated with that user.

At 720, data associated with the audience member is presented. In some embodiments, at least some of the data determined for the audience member is presented in a visual display at a user interface. As such, a user may learn about the audience member(s) of a set of videos through viewing the display with information determined for each engaged audience member of the videos. For example, the list of usernames associated with the determined audience members (or a subset of the determined audience members) may be presented. Also for example, one or more of the determined user engagements associated with each audience member may be presented in a way that indicates the association between the user engagements and the associated audience member. In another example, specific types of user engagements (e.g., user comments that are questions) may be identified and presented in a user interface through which the viewing user (e.g., an account administrator) may be able to directly interact/respond to such user engagements.

Figure 8:
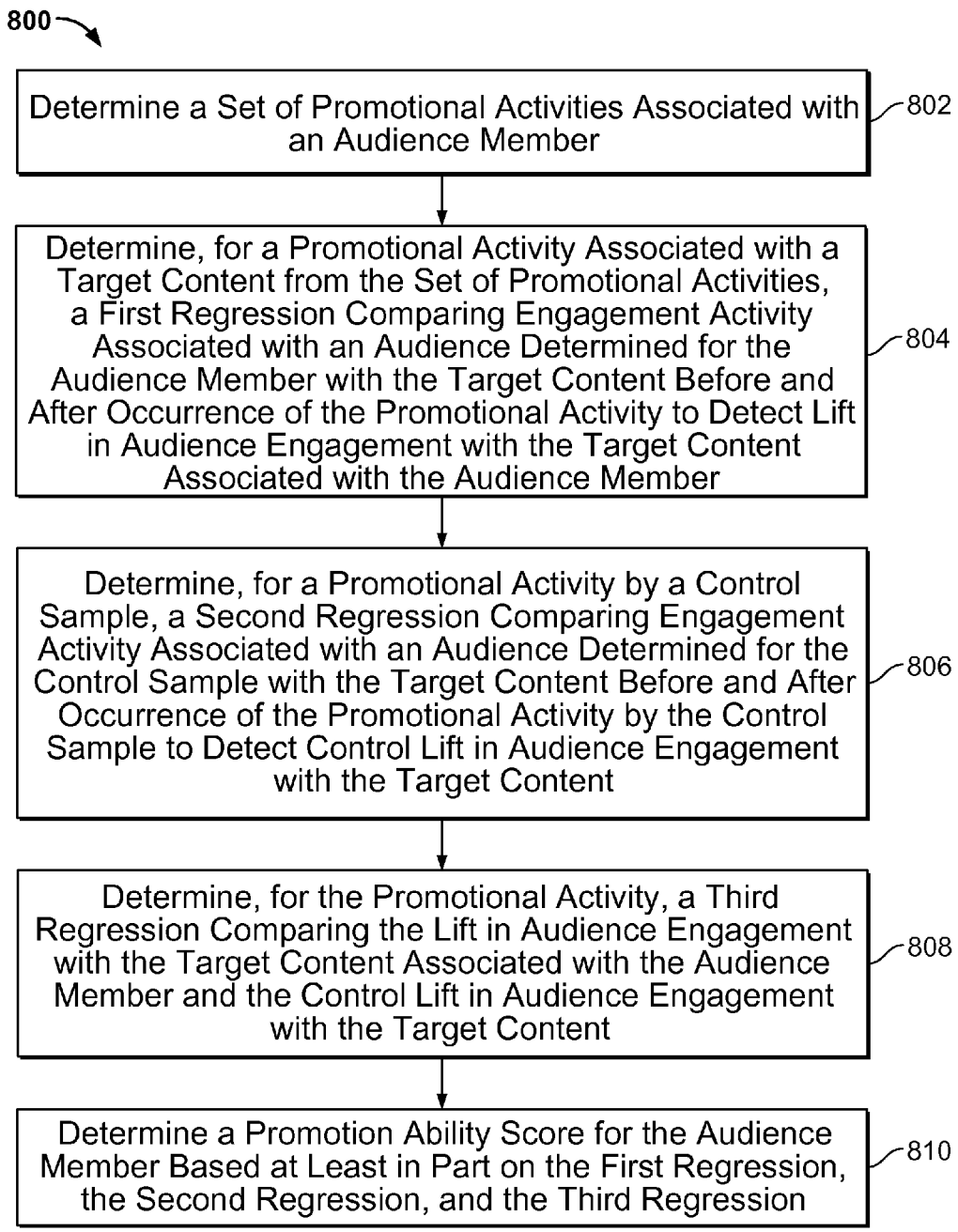
FIG. 8 is a flow diagram showing an embodiment of a process for determining an audience member's ability to drive an audience associated with the audience member.

FIG. 8 is a flow diagram showing an embodiment of a process for determining an audience member's ability to drive an audience associated with the audience member. In some embodiments, 716 of process 700 of FIG. 7 is implemented with process 800 of FIG. 8. In some embodiments, process 800 is implemented at system 100 of FIG. 1.

Process 800 shows an example of determining a value for the audience member, the promotion ability score, which represents the audience member's ability to drive an audience associated with the audience member.

At 802, a set of promotional activities associated with an audience member is determined. For example, a promotional activity may comprise any activity in which the audience member promoted a video to one or more other users. A promotional activity may comprise an engagement such as an audience member selection to like a video, an audience member submission of a comment, an audience member appearing in a video, an audience member selection to add a video as a favorite, and an audience member selection to share a video with at least one other user, for example. Promotional activities may occur at the video website and at other websites (e.g., social network websites). In some embodiments, at least some promotional activities associated with the audience member are determined from engagements retrieved for the audience member. In some embodiments, at least some promotional activities are automatically detected (e.g., by the audience determination service). In some embodiments, at least some promotional activities associated with the audience member are identified through user input (e.g., an audience member tagging a video with a custom keyword, an audience member leaving an audience member on another user's video with a custom code, an audience member emailing the video URL to the audience determination service, an audience member flagging a video in a social network feed, etc.).

At 804, for a promotional activity associated with a target content from the set of promotional activities, a first regression comparing engagement activity associated with an audience determined for the audience member with the target content before and after occurrence of the promotional activity by the audience member to detect lift in audience engagement with the target content associated with the audience member is determined. The audience member's ability to drive his or her audience may be analyzed per each promotional activity or per set of promotional activities. In the example, the audience member's ability to drive his or her own audience may be analyzed per each promotional activity, which is associated with at least one video. For a given promotional activity, a first regression is computed to measure the lift in audience engagement (e.g., an increase in user engagements with respect to the video associated with the promotional activity) after the audience member performed the promotional activity.

At 806, for a promotional activity associated with the target content by a control sample, a second regression comparing engagement activity associated with an audience determined for the control sample with the target content before and after occurrence of the promotional activity by the control sample to detect control lift in audience engagement with the target content is determined. In some embodiments, the control sample is generated by randomly selecting a panel of users that represent the control audience. Typically, a random sample of 100,000 or more video website users is weighted to represent video website's audience as a whole. A second regression is computed to measure the control lift in audience engagement after a promotional activity for the target content is performed by a control sample.

At 808, a third regression comparing the lift in audience engagement with the target content associated with the audience member and the control lift in audience engagement with the target content is determined for the promotional activity. The third regression is computed to compare the lift associated with the audience member versus the lift generated by the control sample. The control sample should be selected such that if the lift generated by the audience member is much greater than the lift generated by the control sample, then it shows that audience member has a relatively strong ability to drive user engagement of video content through a promotion of the video content. For example, an audience member that has many subscribers and/or is a public figure may drive more user engagement to video content through a promotional activity.

At 810, a promotion ability score for the audience member is determined based at least in part on the first regression, the second regression, and the third regression. The promotion ability score may be generated for the audience member based on the analysis of one or more promotional activities that are associated with him or her. For example, the promotion ability score may be on a scale of 0 to 100, where a score of 100 represents the strongest ability to drive an audience and a score of 0 represents the weakest ability to drive an audience. For example, the promotion ability score for the audience member is determined based at least in part on the comparison between the lift generated by the audience member for at least one promotional activity by the audience member and the lift generated by the control sample for at least a promotional activity by the control sample. If the audience member's promotion ability score is considered in determining the audience member's influence score, then in some embodiments, a higher promotion ability score will lead to a higher overall influence score.

Figure 9:
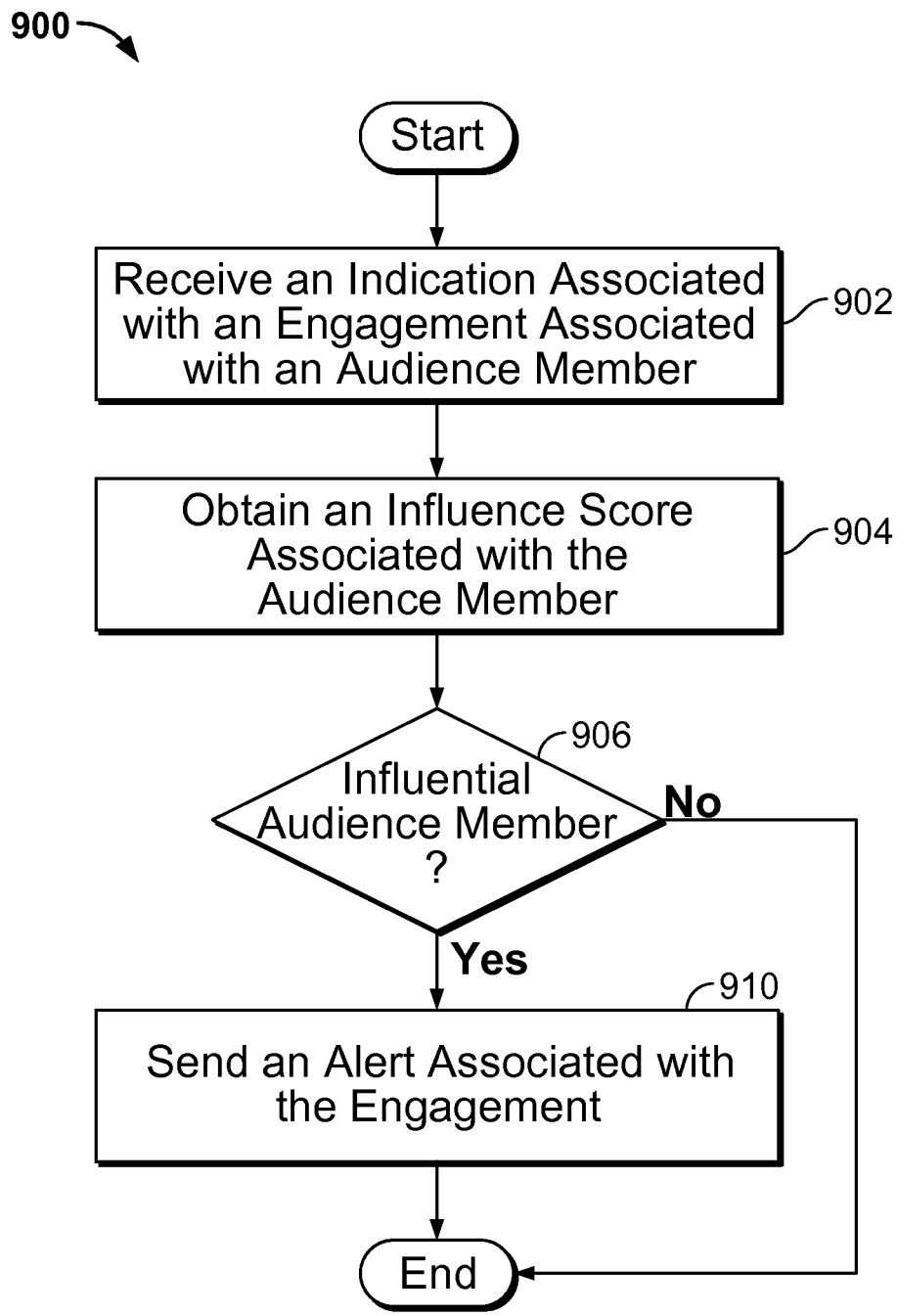
FIG. 9 is a flow diagram showing an embodiment of a process for sending an alert associated with an engagement associated with an audience member.

FIG. 9 is a flow diagram showing an embodiment of a process for sending an alert associated with an engagement associated with an audience member. In some embodiments, process 900 is implemented at system 100 of FIG. 1.

Process 900 illustrates an example of determining when to send an alert based on a detected engagement by an audience member of a set of videos. In some embodiments, the set of videos may have been determined using process 500 of FIG. 5. In some embodiments, the audience member may have been determined using a process such as process 600 of FIG. 6. In some embodiments, the audience determination service may receive a configuration associated with sending alerts when engagements are received from certain types of audience members. Types of audience members may comprise audience members with over X number of subscribers or audience members with over Y number of views, for example. In the example, the configuration is associated with sending an alert (e.g., to a user specified in the configuration) when an engagement by an influential audience member is detected.

At 902, an indication associated with an engagement associated with an audience member is received. An engagement with respect to a video in the identified set of videos is received and the engagement is associated with a user who is identified to be an audience member of the set of videos. For example, the engagement may comprise a user comment.

At 904, an influence score associated with the audience member is obtained. In some embodiments, the influence score associated with the audience member is either retrieved from storage or dynamically computed (e.g., based on a process such as process 700 of FIG. 7). In some embodiments, if the audience member is already determined to be an influential member (whether based on the audience member's influence score and/or based on other factors), 904 may be skipped.

At 906, it is determined whether the audience member is an influential audience member. In the event it is determined that the audience member is an influential audience member, control passes to 910. Otherwise, the process ends. In some embodiments, the audience member may be determined to be an influential audience member based on the audience member's influence score. For example, the audience member may be determined to be an influential audience member if the influence score exceeds a threshold influence score.

At 910, an alert associated with the engagement is sent. For example, an alert may be sent to a user interface associated with the audience determination service and/or to an email address associated with a user. For example, the user to receive the alert may be a content creator who desires to know when a comment is received from an influential audience member. The alert may include a time at which the engagement was received, identifying information of the video the engagement was received with respect to, identifying information associated with the audience member from which engagement was received, and text/media associated with the engagement. The content creator may want to be informed about the comment and have the opportunity to engage with (e.g., respond to) the influential audience member associated with the comment soon after the comment is made. Without such alerts, comments or other types of engagements from influential audience members may become buried among numerous other engagements.

Figure 10:
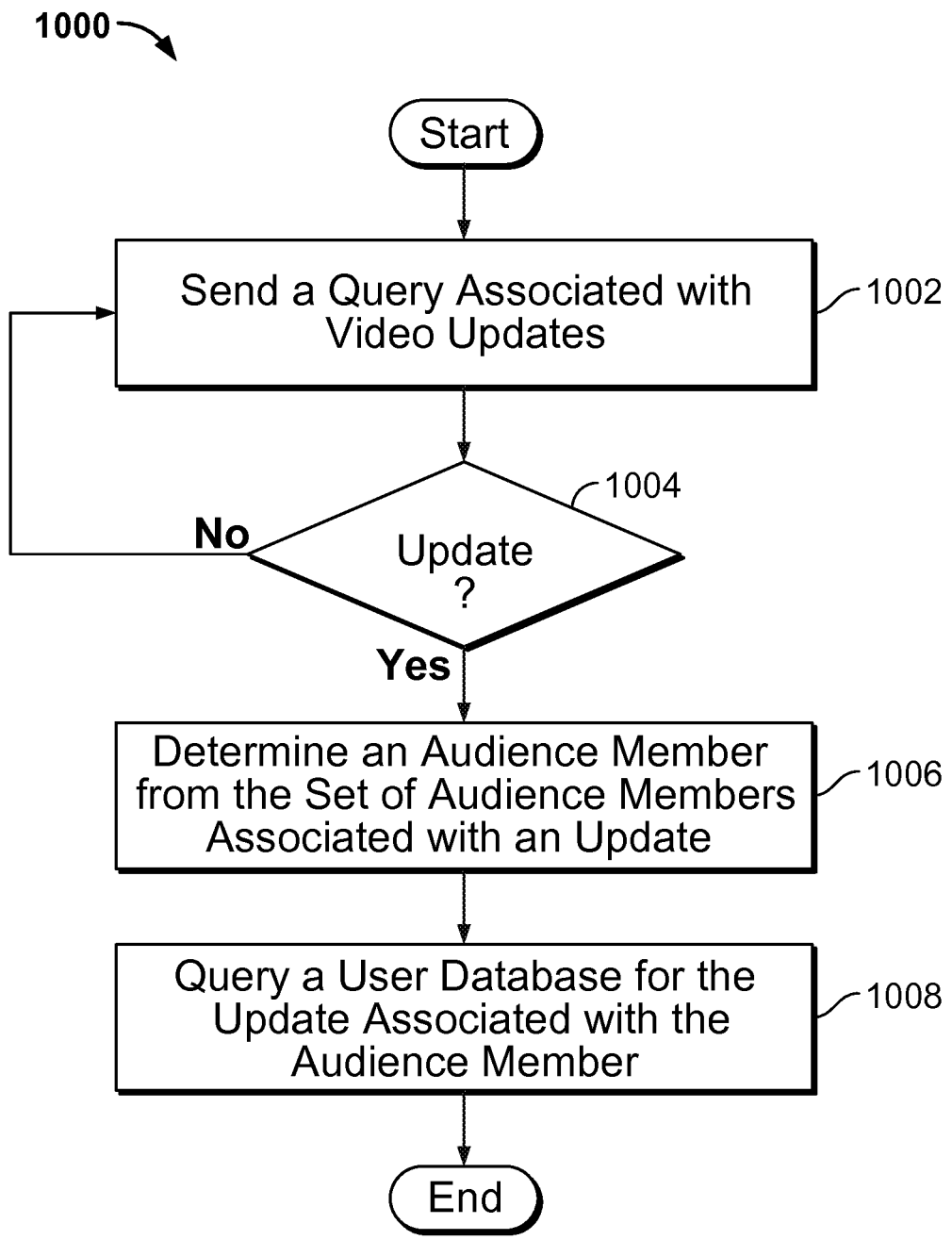
FIG. 10 is a flow diagram showing an embodiment of a process for receiving an update with respect to an audience member.

FIG. 10 is a flow diagram showing an embodiment of a process for receiving an update with respect to an audience member. In some embodiments, process 1000 is implemented at system 100 of FIG. 1.

Process 1000 illustrates an example of updating information gathered for audience members identified by a process such as process 600 of FIG. 6.

At 1002, a query associated with video updates is sent. In some embodiments, a video server is associated with an API that supports a convenient notification technique for API users when a feed is updated. For example, a feed at the video website associated with the video server includes a change to a video channel, a change to an individual video, and/or a change to a user associated with a video. Instead of requiring an API user to frequently query for whether updates have been made to each identified audience member, the API provides a certain protocol that publishes a message at every regular interval (e.g., every 300 seconds) that includes data associated with the user feeds that have been updated in the most recent interval. This way, an API user, such as an audience determination server, may send a query to the API associated with the video server at every interval to receive data on only those user feeds that have been updated in the previous interval. For example, an update to information/a user feed associated with an audience member may be associated with additional engagements made by the audience member and/or a change to the profile data associated with the audience member.

At 1004, it is determined whether to update information associated with any audience member from the set of audience members. In the event it is determined to update information associated with at least one audience member, control passes to 1006. Otherwise, control returns to 1002. Based on the received message, identifying information corresponding to those one or more audience members for whom information has been updated are determined. However, if no audience members are included in the message, then the query is performed again at a later time.

At 1006, an audience member from the set of audience members associated with an update is determined. An audience member (or the user name thereof) that is identified in the message is determined.

At 1008, a user database is queried for an update associated with the audience member. The user database of the video server is queried for updates to an audience member that is identified in the message. In some embodiments, all stored data and/or events for the audience member are queried and the audience determination service will determine the new data and/or events (e.g., new data and/or events comprise data and/or events that the audience determination service has not previously gathered). 1006 and 1008 may be performed for each audience member identified in the message.

Figure 11:
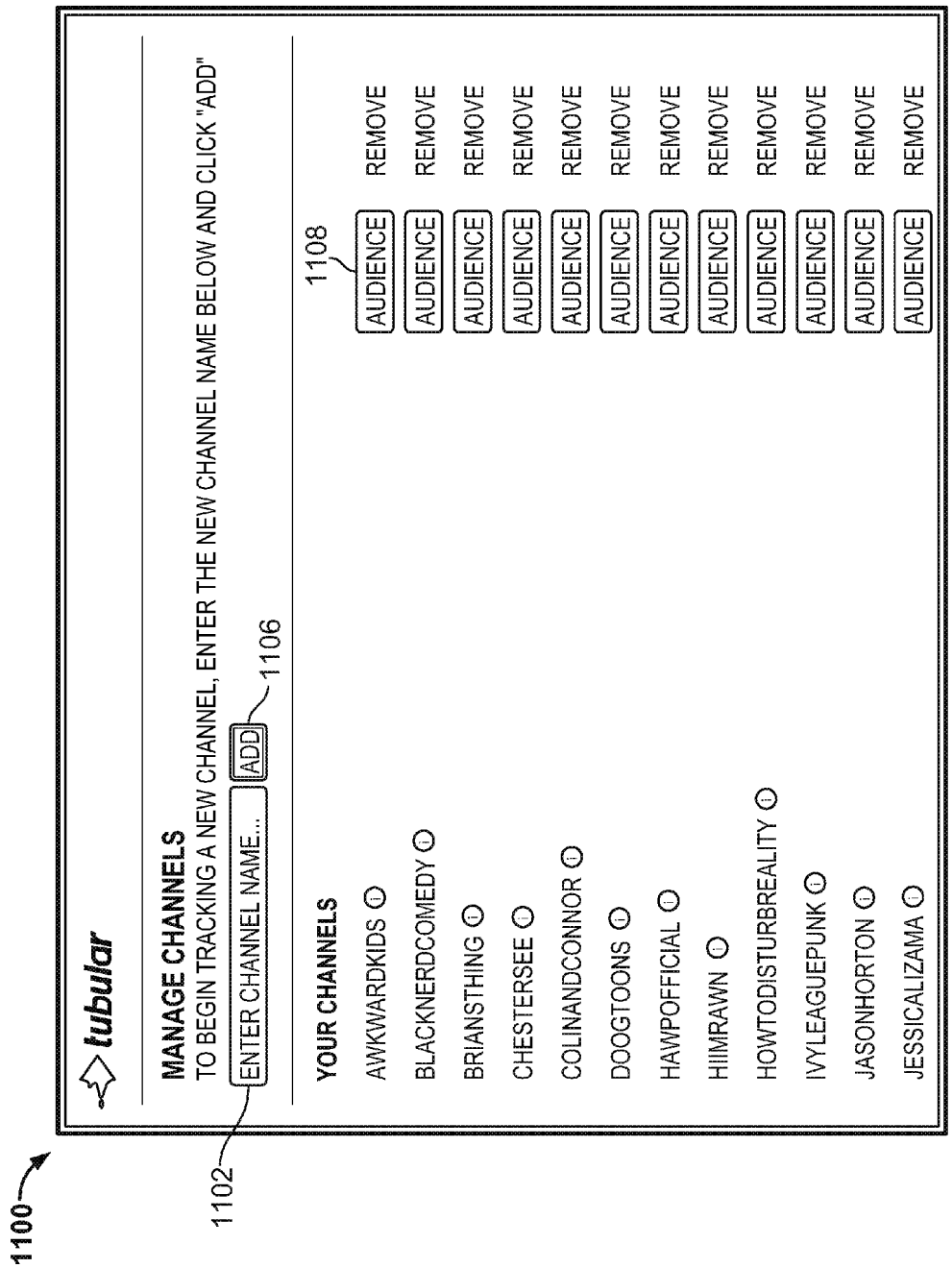
FIG. 11 is a diagram showing an example of a user interface associated with searching for a set of matching videos.

FIG. 11 is a diagram showing an example of a user interface associated with searching for a set of matching videos. In some embodiments, user interface 1100 is implemented using system 100 of FIG. 1. User interface 1100 is an example of a user interface of the audience determination service through which a user may search for sets of videos to monitor and for which to determine audience members. In this example, users may search for video channels for which to determine audience members. For example, a user may input keywords at input box 1102 associated with a video channel for which he or she would like to track the audience. After entering one or more keywords into input box 1102, the user may select "Add" button 1106 to begin a search for matching video channels. The user may select one such matching video channel to begin to search for audience members for that video channel. User interface 1100 also includes several video channels under the "Your channels" column that the user has previously searched for and/or selected to monitor the audience members thereof. "Awkwardkids" is the name of such a video channel that the user has previously searched for and/or is currently monitoring the audience members thereof. To view a visual display regarding audience members found for the "Awkwardkids" video channel, the user may select "Audience" button 1108.

In the example, video channels were being matched to the user input keywords. In other examples, individual videos (across one or more video channels) may be matched against the keywords.

FIG. 12 is a diagram showing an example of a user interface with a display associated with audience members found for a particular video channel. In some embodiments, user interface 1200 is implemented using system 100 of FIG. 1. User interface 1200 shows a visual display determined based on the audience members found for the video channel with the name of "theminashow" 1202 at a video website. The video channel "theminashow" 1202 comprises a monitored video channel (set of videos) for which audience information is tracked and managed by the audience determination service. User interface 1200 shows a list of audience members determined for "theminashow" 1202 in "Audience List" tab 1216 and under column "USERS" 1208. Also under "Audience List" tab 1216 are columns "ENGAGEMENTS" 1210, "VIDEOS ENGAGED" 1212, and "USER'S OWN SUBSCRIBERS" 1214. For example, the data displayed for each audience member may have been determined with a process such as process 700 of FIG. 7, for example. "ENGAGEMENTS" 1210 refers to the number of engagements (e.g., user comments, user preference activities, user shares with another user, addition to a playlist) that the audience member has made with respect to a video associated with video channel "theminashow" 1202, "VIDEOS ENGAGED" 1212 refers to the number of videos associated with video channel "theminashow" 1202 for which the audience member has made engagements, and "USER'S OWN SUBSCRIBERS" 1214 refers to the number of subscribers that the audience member has of his or her own (e.g., at a single video website or aggregated across multiple platforms).

As shown in the example, the audience member "ilovetalkshows" has made 9 engagements with videos associated with video channel "theminashow" 1202, has made engagements with 9 videos associated with video channel "theminashow" 1202, and has "541,696" subscribers. The list of audience members under column "USERS" 1208 may be sorted based on either their respective number of engagements, number of videos engaged, or number of subscribers when the user selects one of columns "ENGAGEMENTS" 1210, "VIDEOS ENGAGED" 1212, and "USER'S OWN SUBSCRIBERS" 1214. In the example, the list of audience members under column "USERS" 1208 is sorted by their respective number of subscribers because column "USER'S OWN SUBSCRIBERS" 1214 has been selected. If the user is currently signed in through a user account associated with a video website, the user may even select "Subscribe" button 1218 to subscribe to the videos associated with video channel "theminashow" 1202. The user may further interact with the visual display of user interface 1200 by selecting one or more filters in section 1206. For example, the user may filter to see only audience members associated with a particular age group (e.g., "Any," "13-17," "18-24," etc.), a likely gender (e.g., "Any," "Male," "Female"), engagements (e.g., posted a comment, added to favorites, added to a playlist), whether the user is currently subscribed to the video channel (e.g., "Subscribed," "Not subscribed"), the number of subscribers the audience member has (e.g., "10+," "500+," "1,000+"), which country the audience member is from, and a particular type associated with the audience member (e.g., "Guru," "Director," "Comedian," etc.).

The user may also select area 1204 to select a user created list of audience members to view in the display. For example, a user may choose to add a subset of all the found audience members into a list and store the list. The list may include a common theme or a particular audience member attribute, for example. The user may choose to view data associated with all found audience members (such as in the example where the list "Audience" is selected) or with a selected list of at least a subset of the audience members.

User interface 1200 provides an interactive display of intelligence compiled for each audience member for a set of videos such that a user may choose to view information on individual audience members and different subsets of audience members at a time. The information provided at user interface 1200 may be aggregated across several videos, which makes it convenient for a user to consume without needing to manually analyze each individual video associated with a set at a time.

Figure 13:
FIG. 13 is a diagram showing an example of a user interface with a display of other video content that audience members watch.

FIG. 13 is a diagram showing an example of a user interface with a display of other video content that audience members watch. In some embodiments, user interface 1300 is implemented using system 100 of FIG. 1. User interface 1300 is similar to user interface 1200 of FIG. 12 except that in user interface 1300, "Audience Also Watches" tab 1302 has been selected. For example, based on the data gathered for each audience member based on a process such as process 700 of FIG. 7, other videos (besides the videos associated with the monitored video channel in the example "theminashow") that the audience members for the video channel "theminashow" either watch and/or engage with are determined. The information gathered on what other video content the audience members watch can be displayed as shown in the example, in columns "USERS" 1304, "AUDIENCE OVERLAP" 1306, and "ENGAGEMENT LEVEL" 1308. "USERS" 1304 refers to a list of other video channels the audience members of "theminashow" also watch or are engaged with, "AUDIENCE OVERLAP" 1306 refers to the percentage of overlap between the audience of the other video channel and the audience for "theminashow," and "ENGAGEMENT LEVEL" 1308 refers to the total number of engagements the most influential audience members of "theminashow" have made with the other video channel. Similar to user interface 1200 of FIG. 12, the user may apply filters to the displayed content associated with audience members based on the filters on the left-side of user interface 1300.

User interface 1300 is helpful in informing users what other video content and topics the audience members of a monitored set of videos are interested in. This may help the users determine appropriate types of ads to serve at the webpages associated with the monitored set of videos.

Figure 14:
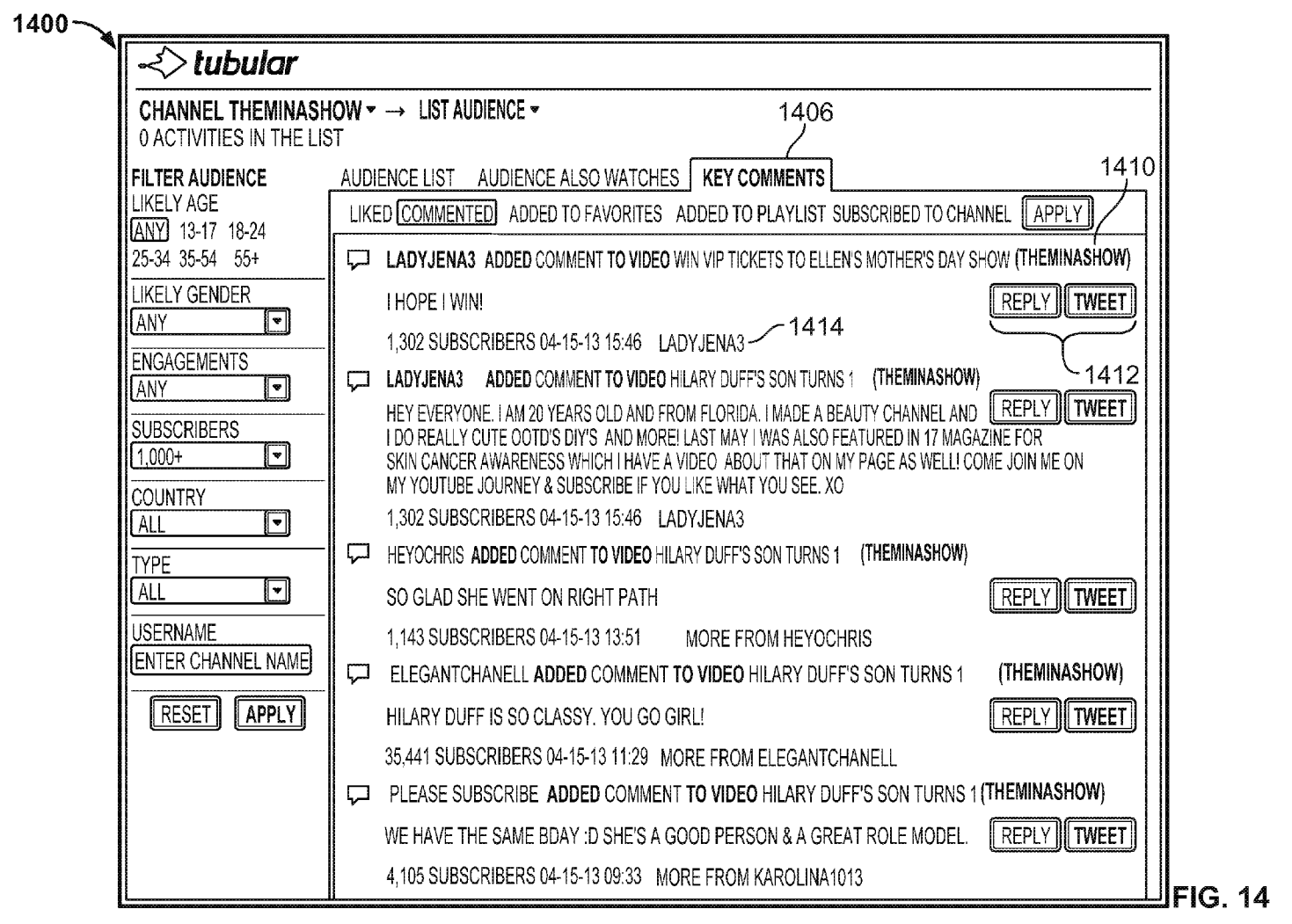

FIG. 14 is a diagram showing an example of a user interface for viewing key comments. In some embodiments, user interface 1400 is implemented using system 100 of FIG. 1. User interface 1400 is similar to user interface 1200 of FIG. 12 except that in user interface 1400, "Key comments" tab 1406 has been selected. User interface 1400 displays a list of audience member submitted comments for any video associated with the monitored video channel "theminashow" at the video website. For example, the user comments associated with any videos of the monitored video channel may be detected over time and featured at user interface 1400 (e.g., where the most recently posted user comments are displayed at the top of the list). In the example, user comment 1410 was posted by audience member "ladyjena3" for the video titled "Win VIP Tickets to Ellen's Mother's Day Show" with the text "I hope I win!" Area 1414 of user comment 1410 summarizes some data associated with audience member "ladyjena3" such as that the audience member has 1,302 subscribers. The user may reply directly to the user comment by selecting the "Reply" button in area 1412 or the user may also Tweet the user comment at the user's Twitter® account by selecting the "Tweet" button in area 1412.

The user may use interface 1400 to monitor the stream of user comments from audience members coming in for any video of a monitored set of videos and even reply to them in-line in the user interface.

Figure 15:
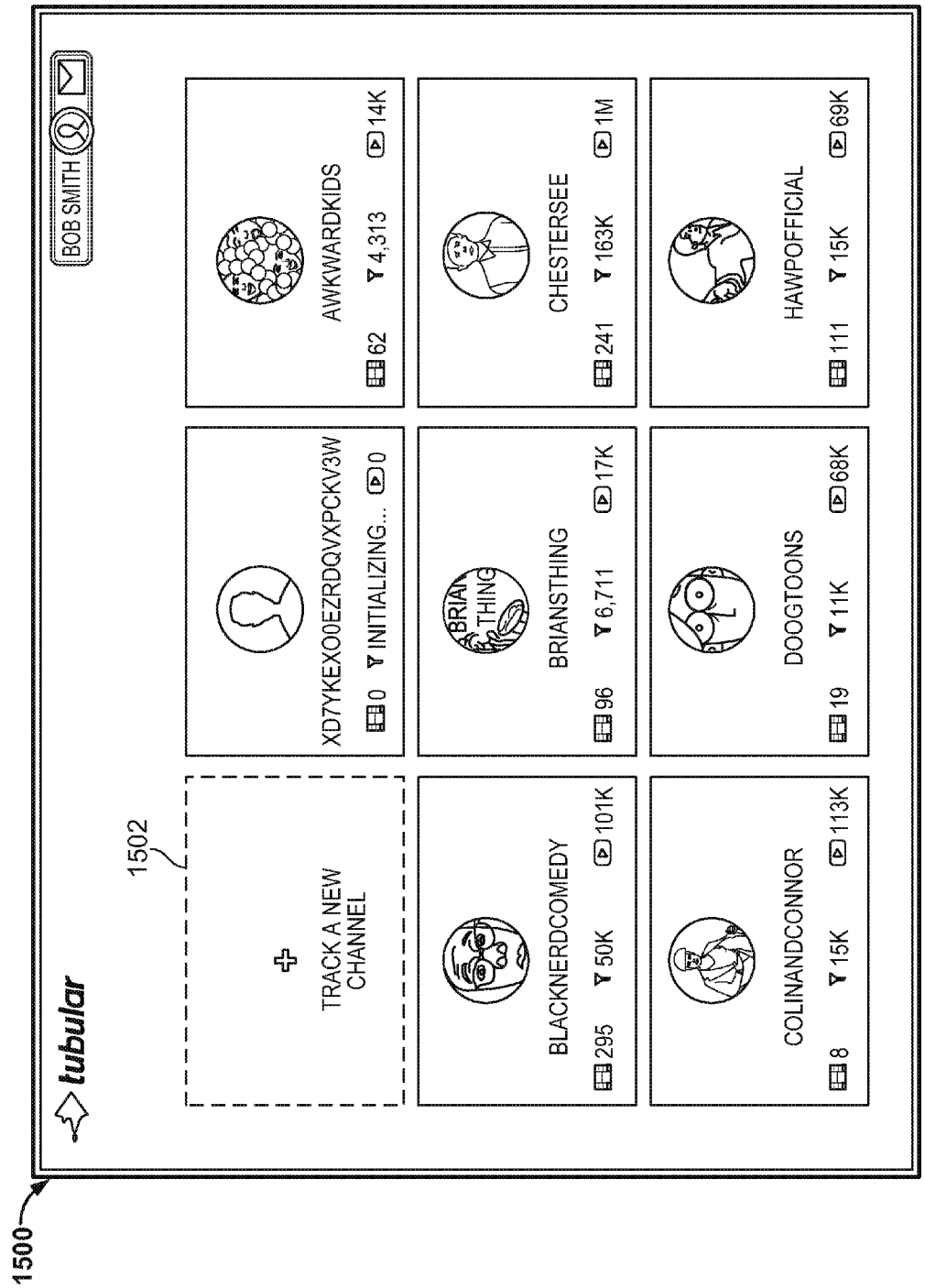
FIG. 15 is a diagram showing another example of a user interface associated with searching for a set of matching videos.

FIG. 15 is a diagram showing another example of a user interface associated with searching for a set of matching videos. In some embodiments, user interface 1500 is implemented using system 100 of FIG. 1. User interface 1500 is an example of a user interface of the audience determination service through which a user may search for sets of videos to monitor and for which to determine audience members. User interface 1500 is similar to user interface 1100 of FIG. 11, except each video channel that the user has previously searched for and/or selected to monitor the audience members thereof is presented as a tile, with an image associated with the video channel. The user may select the tile associated with a video channel to view information associated with the audience members found for that video channel. To search for a new video channel to monitor, the user may select tile 1502 with the message "Track a new channel" to be prompted to enter keywords associated with a video channel the user desires to track.

FIG. 16 is a diagram showing another example of a user interface with a display associated with audience members that have been found for a particular video channel. In some embodiments, user interface 1600 is implemented using system 100 of FIG. 1. User interface 1600 shows a visual display determined based on the audience members found for the video channel with the name of "cindyslookbook" 1612 at a video website. The video channel "cindyslookbook" 1612 comprises a monitored video channel (set of videos) for which audience information is tracked and managed by the audience determination service. In user interface 1600, "AUDIENCE" tab 1608 has been selected and "Fans" button 1618 has also been selected. As such, column "CHANNEL" 1614 shows a list of audience members determined for "cindyslookbook" 1612. In the example, because "Fans" button 1618 has been selected, column "CHANNEL" 1614 shows a list of all audience members that have been identified for the video channel "cindyslookbook" 1612. In the example, each audience member is identified by the name of an associated video channel. Also under "AUDIENCE" tab 1608 are also columns "ACTIVITIES" 1602, "VIDEOS ENGAGED" 1604, and "SUBSCRIBERS" 1606. For example, the data displayed for each video channel audience member may have been determined with a process such as process 700 of FIG. 7, for example.

"ACTIVITIES" 1602 refers to the number of engagements (e.g., submission of user comments, indication of preference, adding to favorites, adding to a playlist, sharing with another user, subscribing to the video channel) that the audience member has made with respect to a video associated with video channel "cindyslookbook" 1612, "VIDEOS ENGAGED" 1604 refers to the number of videos associated with video channel "cindyslookbook" 1612 for which the audience member has made engagements, and "SUBSCRIBERS" 1606 refers to the number of subscribers that the video channel audience member has of its own (e.g., at a single video website or aggregated across multiple platforms). As shown in the example, the video channel audience member "bluegirl267" has made 203 engagements with videos associated with video channel "cindyslookbook" 1612, has made engagements with 45 videos associated with video channel "cindyslookbook" 1612, and has "0" subscribers of its own. The list of audience members under column "CHANNEL" 1614 may be sorted based on either their respective number of engagements, number of videos engaged, or number of subscribers when the user selects one of columns "ACTIVITIES" 1602, "VIDEOS ENGAGED" 1604, and "SUBSCRIBERS" 1606. In the example, the list of audience members under column "CHANNEL" 1614 is sorted by their respective number of user engagements because column "ACTIVITIES" 1602 has been selected. The user may further interact with the visual display of user interface 1600 by selecting one or more filters in section 1610. For example, filters in section 1610 may be used to filter out audience members that are either subscribers or not subscribers to video channel "cindyslookbook" 1612, filter out audience members based on the number of user engagements each has made with respect to video channel "cindyslookbook" 1612, filter out audience members based on the number of subscribers that each audience member has, and/or filter out audience members from a particular country.

FIG. 17 is a diagram showing another example of a user interface with a display associated with the identified subset of influential audience members that have been found for a particular video channel. In some embodiments, user interface 1700 is implemented using system 100 of FIG. 1. User interface 1700 shows a visual display determined based on the audience members identified to be influential of the audience members found for the video channel "cindyslookbook" at a video website. User interface 1700 is similar to user interface 1600 of FIG. 16 except that in user interface 1700, "Influencers" button 1702 has been selected, and so column "CHANNEL" 1704 shows a list of the subset of influential audience members ("influencers") that have been identified for the video channel "cindyslookbook." For example, the influencers are determined based on a process such as process 900 of FIG. 9. In the example, identified influencer "anneorshine" has had 11 user engagements with respect to the video channel "cindyslookbook," user engagements with 3 videos associated with the video channel "cindyslookbook, and has 405K subscribers of its own. A viewing user (of user interface 1700 may select "Influencers" button 1702 to quickly see the list of the most influential audience members of the monitored video channel.

Figure 18:
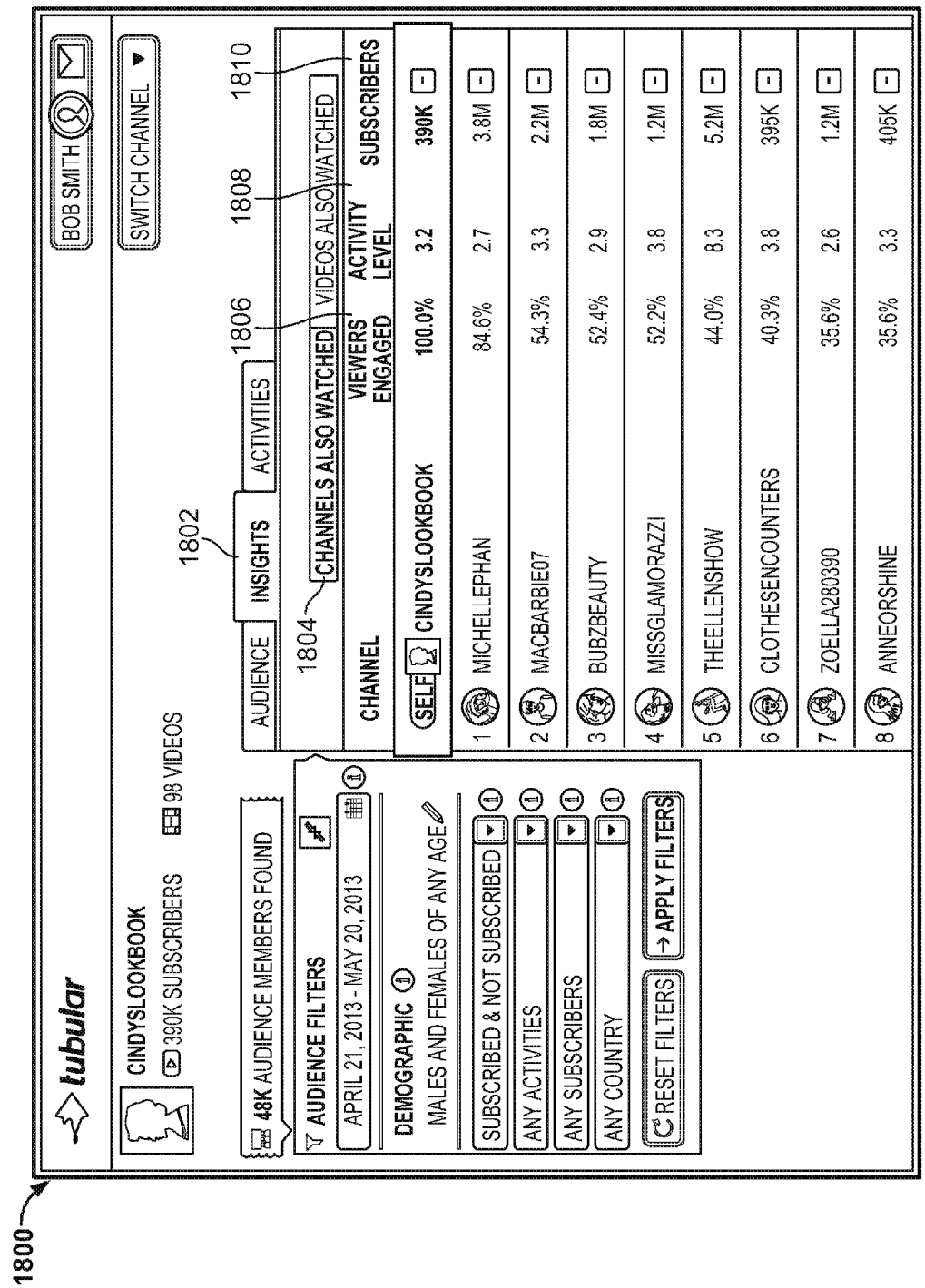
FIG. 18 is a diagram showing another example of a user interface with a display of other video content that audience members watch.

FIG. 18 is a diagram showing another example of a user interface with a display of other video content that audience members watch. In some embodiments, user interface 1800 is implemented using system 100 of FIG. 1. User interface 1800 is similar to user interface 1600 of FIG. 16 except that "INSIGHTS" tab 1802 has been selected. Under "INSIGHTS" tab 1802, "Channels Also Watched" button 1804 has been selected and so the "CHANNEL" column includes a list of other video channels that the set of audience members for the video channel "cindyslookbook" have previously engaged with. Also under "Channels Also Watched" tab 1804 are also columns "VIEWERS ENGAGED" 1806, "ACTIVITY LEVEL" 1808, and "SUBSCRIBERS" 1810. Columns "VIEWERS ENGAGED" 1806 refers to the percentage of the audience members identified for the video channel "cindyslookbook" that has previously engaged with the other video channel, "ACTIVITY LEVEL" 1808 refers to the average number of activities (engagements) associated with the other video channel that the audience members identified for the video channel "cindyslookbook" that has previously performed, and "SUBSCRIBERS" 1810 refers to the number of subscribers that the other video channel has (e.g., at a single video website or aggregated across multiple platforms). For example, one such video channel that the set of audience members for the video channel "cindyslookbook" has previously engaged with is "michellephan." For the other video channel "michellephan," it is determined that 84.6% of audience members identified for the video channel "cindyslookbook" has also engaged with video(s) associated with the video channel "michellephan," the average number of activities (engagements) associated with the video channel "michellephan" per each audience member identified for the video channel "cindyslookbook" is 2.7, and that the video channel "michellephan" has 3.8 million subscribers. The viewing user may use user interface 1800 to learn what other video channels that the audience members of the monitored video channel are also engaged with and to what extent.

Figure 19:
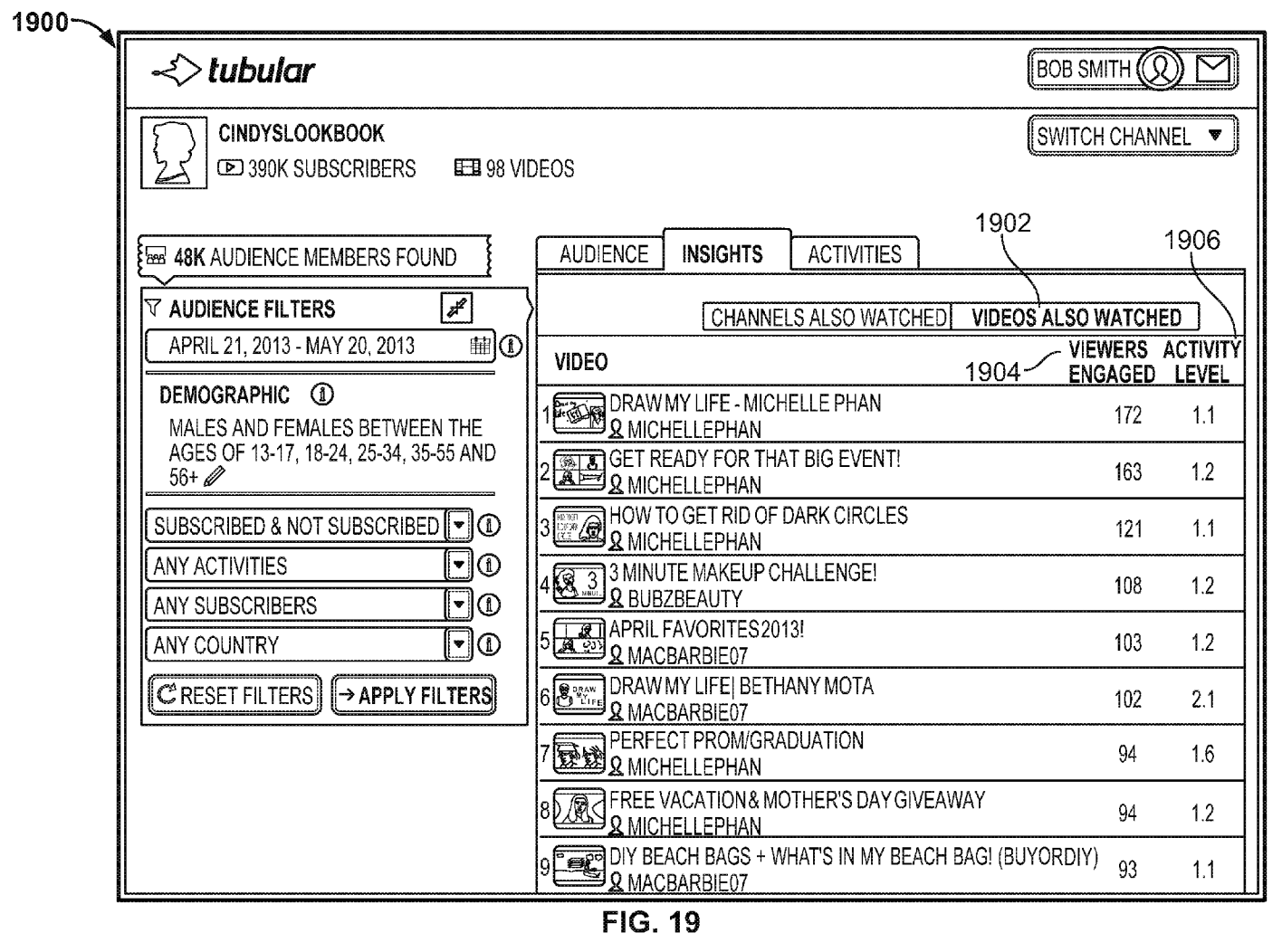

FIG. 19 is a diagram showing another example of a user interface with a display of other video content that audience members watch. In some embodiments, user interface 1900 is implemented using system 100 of FIG. 1. User interface 1900 is similar to user interface 1800 of FIG. 18 except "Videos Also Watched" button 1902 has been selected and so the "VIDEO" column includes a list of other individual videos that the set of audience members identified for the video channel "cindyslookbook" have previously engaged with. Also under "Videos Also Watched" tab 1902 are also columns "VIEWERS ENGAGED" 1904 and "ACTIVITY LEVEL" 1906. Column "VIEWERS ENGAGED" 1904 refers to the number of audience members identified for the video channel "cindyslookbook" that has previously engaged with the other video channel (compared to other channels) and "ACTIVITY LEVEL" 1906 refers to the average number of activities associated with the other video channel that each audience member identified for the video channel "cindyslookbook" has previously performed. For example, one such video that the set of audience members identified for the video channel "cindyslookbook" has previously engaged with is titled "Draw My Life—Michelle Phan." For the video titled "Draw My Life—Michelle Phan," 172 of audience members identified for the video channel "cindyslookbook" have previously engaged with the video and per each such audience member, there is an average of 1.1 activities (engagements) for the video. The viewing user may use user interface 1900 to learn what other individual videos that the audience members of the monitored video channel are also engaged with and to what extent.

Figure 20:
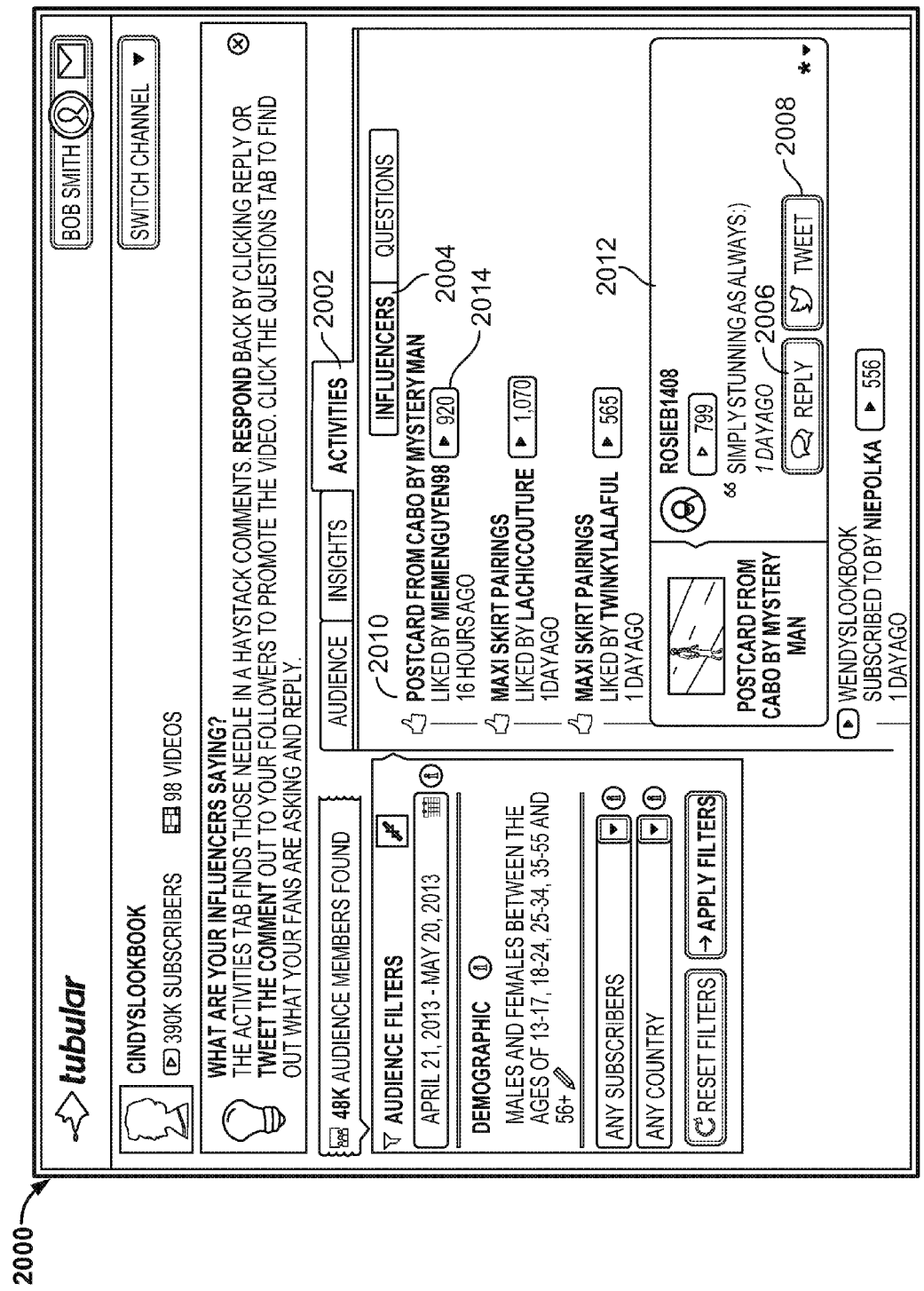
FIG. 20 is a diagram showing another example of a user interface for viewing activities associated with influential audience members.

FIG. 20 is a diagram showing another example of a user interface for viewing activities associated with influential audience members. In some embodiments, user interface 2000 is implemented using system 100 of FIG. 1. User interface 2000 is similar to user interface 1600 of FIG. 16 except "ACTIVITIES" tab 2002 has been selected and "Influencers" button 2004 has also been selected. As a result, activities (engagements) performed by identified influential audience members ("influencers," such as those displayed in user interface 1700 of FIG. 17) for the video channel "cindyslookbook" are populated in the feed of "ACTIVITIES" tab 2002. For example, activity 2010 is a preference activity for the video titled "Postcard from Cabo by Mystery Man" associated with influential audience member "miemienyguyen98." Icon 2014 denotes the current number of subscribers that audience member "miemienyguyen98" has, which is 920. In another example, activity 2012 is a user comment ("simply stunning as always:)") for the video titled "Postcard from Cabo by Mystery Man" associated with influential audience member "rosieb1408," which currently has 799 subscribers. The viewing user may even interact with the activity in-line by selecting "Reply" button 2006 or the user may also Tweet the user comment at the user's Twitter® account by selecting "Tweet" button 2008. In some embodiments, the activity feed of user interface 2000 will periodically refresh with new activities detected for the monitored video channel (e.g., using a process such as process 1000 of FIG. 10). The viewing user may use user interface 2000 to monitor activities performed by influential audience members and potentially interact with such activities without needing to manually find influential audience members and/or activities associated with such audience members at the webpages associated with the videos of the monitored video channel.

Figure 21:
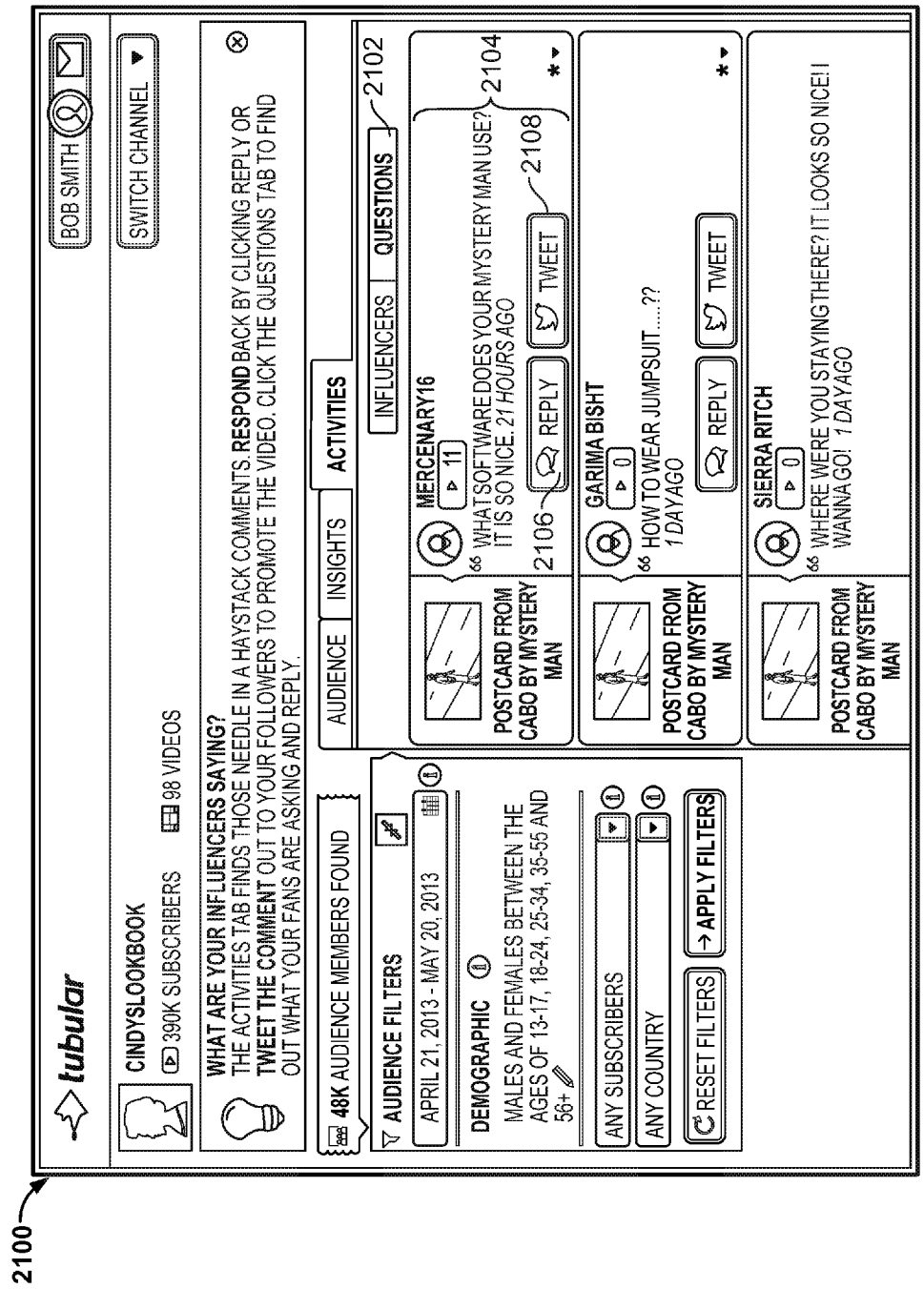
FIG. 21 is a diagram showing an example of a user interface for viewing questions submitted by audience members.

FIG. 21 is a diagram showing an example of a user interface for viewing questions submitted by audience members. In some embodiments, user interface 2100 is implemented using system 100 of FIG. 1. User interface 2100 is similar to user interface 2000 of FIG. 20 except "Questions" button 2102 has been selected. As a result, a specific type of activities, questions, posted by audience members (regardless of their influence) for a video associated with the video channel "cindyslookbook" are populated in the feed of "ACTIVITIES" tab 2002. For example, a question may be a user comment that is detected to include a question mark "?" punctuation. For example, question 2104 ("What software does your Mystery Man use? It is so nice.") was submitted by audience member "mercenary16", which has 11 subscribers, for the video titled "Postcard from Cabo by Mystery Man." The viewing user may respond to each question in-line by selecting "Reply" button 2106 or the user may also Tweet the user comment at the user's Twitter® account by selecting "Tweet" button 2108. In some embodiments, the activity feed of user interface 2100 will periodically refresh with new questions detected for the monitored video channel (e.g., using a process such as process 1000 of FIG. 10). The viewing user may use user interface 2100 to monitor questions posed by audience members and potentially answer such questions without needing to manually find questions associated with the videos of the monitored video channel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   query a video database to retrieve engagements associated with a set of videos;
   process the engagements to identify an audience member associated with the set of videos;
   query one or more user databases to gather events associated with the audience member; and
   determine whether the audience member comprises an influential audience member based at least in part on the events associated with the audience member wherein to determine whether the audience member comprises the influential audience member comprises to:
   determine an influence score associated with the audience member based at least in part on the events associated with the audience member; and
   compare the influence score associated with the audience member to a threshold influence score; and
   a memory coupled to the processor and configured to provide the processor with instructions.

2. The system of claim 1, wherein the engagements include one or more of the following: a user posting of a comment, a user selection to like a video, a user selection to add a video as a favorite, a user selection to share a video with another user, a user selection to add a video to a playlist, and a user selection to subscribe to a video channel.

3. The system of claim 1, wherein the processor is further configured to identify the set of videos based at least in part on a received criterion.

4. The system of claim 3, wherein to identify the set of videos based at least in part on the received criterion includes to:
   determine a set of video channels that match the criterion; and
   query the video database for videos associated with the set of video channels to include in the set of videos.

5. The system of claim 1, wherein the processor is further configured to perform filtering on the set of videos.

6. The system of claim 1, wherein the processor is further configured to query the one or more user databases for user profile data associated with the audience member.

7. The system of claim 6, wherein the user profile data includes one or more of the following: the audience member's location, the audience member's age, the audience member's gender, the audience member's subscriptions to which video channels, identifying information associated with videos that the audience member has uploaded to his or her video channel, a number of views of the uploaded videos, and identifying information associated with users that subscribe to the audience member's video channel.

8. The system of claim 1, wherein the events queried for the audience member include one or more of the following: a number of times the audience member has engaged with video content including the set of videos, a number of views of video content uploaded by the audience member, a number of subscribers associated with the audience member, a rate of new subscribers associated with the audience member, a number of videos in the set of videos with which the audience member has engaged, and an ability associated with the audience member to drive an audience associated with the audience member.

9. The system of claim 1, wherein in the event that the audience member is determined to comprise the influential audience member, the processor is further configured to:
   determine that a subsequently received engagement is received from the influential audience member; and
   send an alert associated with the subsequently received engagement based at least in part on the determination.

10. The system of claim 1, wherein the processor is further configured to present data associated with the audience member.

11. The system of claim 1, wherein the processor is further configured to:
   send a query associated with video updates;
   receive a message associated with video updates;
   determine that the audience member is associated with a video update based at least in part on the message; and
   query the one or more user databases for the video update associated with the audience member.

12. The system of claim 1, wherein to query the video database includes to use an application programming interface (API) call.

13. The system of claim 1, wherein to query the video database includes to crawl a webpage.

14. The system of claim 1, wherein the video database and the one or more user databases comprise a same database.

15. The system of claim 1, wherein to process the engagements to identify the audience member associated with the set of videos includes to:
   extract a set of user names from the engagements; and
   extract a unique user name from the set of user names, wherein the unique user name comprises the audience member.

16. The system of claim 1, wherein to query the video database comprises the processor being configured to send a request to a message broker server to cause the message broker server to send one or more queries to the video database.

17. A method, comprising:
   querying a video database to retrieve engagements associated with a set of videos;
   processing, using a processor, the engagements to identify an audience member associated with the set of videos;
   querying one or more user databases to gather events associated with the audience member; and
   determining whether the audience member comprises an influential audience member based at least in part on the events associated with the audience member, wherein determining whether the audience member comprises the influential audience member comprises:
      determining an influence score associated with the audience member based at least in part on the events associated with the audience member; and
      comparing the influence score associated with the audience member to a threshold influence score.

18. The method of claim 17, wherein the engagements include one or more of the following: a user posting of a comment, a user selection to like a video, a user selection to add a video as a favorite, a user selection to share a video with another user, a user selection to add a video to a playlist, and a user selection to subscribe to a video channel.

19. The method of claim 17, further comprising querying the one or more user databases for user profile data associated with the audience member.

20. The method of claim 19, wherein the user profile data includes one or more of the following: the audience member's location, the audience member's age, the audience member's gender, the audience member's subscriptions to which video channels, identifying information associated with videos that the audience member has uploaded to his or her video channel, a number of views of the uploaded videos, and identifying information associated with users that subscribe to the audience member's video channel.

21. The method of claim 17, wherein the events queried for the audience member include one or more of the following: a number of times the audience member has engaged with video content including the set of videos, a number of views of video content uploaded by the audience member, a number of subscribers associated with the audience member, a rate of new subscribers associated with the audience member, a number of videos in the set of videos with which the audience member has engaged, and an ability associated with the audience member to drive an audience associated with the audience member.

22. The method of claim 17, wherein in the event that the audience member is determined to comprise the influential audience member, further comprising:
   determining that a subsequently received engagement is received from the influential audience member; and
   sending an alert associated with the subsequently received engagement based at least in part on the determination.

23. A computer program product, the computer program product comprising a non-transitory computer readable storage medium and comprising computer instructions for:
   querying a video database to retrieve engagements associated with a set of videos;
   processing the engagements to identify an audience member associated with the set of videos;
   querying one or more user databases to gather events associated with the audience member; and
   determining whether the audience member comprises an influential audience member based at least in part on the events associated with the audience member, wherein determining whether the audience member comprises the influential audience member comprises:
      determining an influence score associated with the audience member based at least in part on the events associated with the audience member; and
      comparing the influence score associated with the audience member to a threshold influence score.

* * * * *